(12) United States Patent
Rasmussen et al.

(10) Patent No.: US 7,822,100 B2
(45) Date of Patent: Oct. 26, 2010

(54) PHASE MAPPING FOR QPSK/QBL-MSK WAVEFORM

(75) Inventors: Donald John Rasmussen, Fort Wayne, IN (US); Delbert Todd Mulholland, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1322 days.

(21) Appl. No.: 11/314,762

(22) Filed: Dec. 21, 2005

(65) Prior Publication Data

US 2007/0025235 A1    Feb. 1, 2007

Related U.S. Application Data

(60) Provisional application No. 60/703,179, filed on Jul. 28, 2005.

(51) Int. Cl.
H04B 1/00    (2006.01)
(52) U.S. Cl. .................. 375/136; 375/135; 375/130; 375/132
(58) Field of Classification Search ............... 375/136, 375/135, 130, 132
See application file for complete search history.

(56) References Cited

U.S. PATENT DOCUMENTS

| | | | |
|---|---|---|---|
| 3,938,045 A | 2/1976 | Mathwich | |
| 4,057,759 A | 11/1977 | Genova et al. | |
| 4,516,087 A | 5/1985 | Bruene | |
| 4,962,510 A * | 10/1990 | McDavid et al. | 375/308 |
| 5,157,693 A | 10/1992 | Lemersal, Jr. et al. | |
| 5,177,765 A | 1/1993 | Holland et al. | |
| 5,195,108 A | 3/1993 | Baum et al. | |
| 5,692,007 A | 11/1997 | Durrant et al. | |
| 5,732,106 A | 3/1998 | Rasmussen et al. | |
| 5,818,867 A * | 10/1998 | Rasmussen et al. | 375/146 |
| 6,002,710 A | 12/1999 | Hendrickson et al. | |
| 6,320,915 B1 * | 11/2001 | Stott et al. | 375/340 |
| 6,674,790 B1 | 1/2004 | Rasmussen et al. | |
| 6,859,463 B1 | 2/2005 | Mayor et al. | |
| 7,639,730 B2 * | 12/2009 | Rasmussen | 375/142 |

(Continued)

OTHER PUBLICATIONS

David Wyskiel et al.; "Modulator Design and Architecture for Multiple Wireless Applications", IEEE, 1997, pp. 810-813.

(Continued)

*Primary Examiner*—Shuwang Liu
*Assistant Examiner*—Kenneth Lam
(74) *Attorney, Agent, or Firm*—RatnerPrestia

(57) ABSTRACT

A method of pulse shaping a spread signal of serially formatted in-phase (I) and quadrature (Q) waveforms, where each waveform includes a predetermined number of chips per symbol, includes (a) examining adjacent chips of the I and Q waveforms at a symbol boundary; and (b) determining that one of the I or Q waveforms, includes two adjacent first and second chips separated by a single chip period, where the first chip belongs to a previous symbol and the second chip belongs to a present symbol. If the chips are of the same value, the method extends a peak value between the first and second chips, and zeros the other waveform of the I or Q waveform during the extended duration. If the chips are of opposite values, then the method zeroes one of the chips and inserts a chip into the other waveform.

9 Claims, 32 Drawing Sheets

U.S. PATENT DOCUMENTS

2006/0215736 A1* 9/2006 Rasmussen ................. 375/146

OTHER PUBLICATIONS

Donald J. Rasmussen et al.; "Serial Demodulation of an OQPSK Direct Sequence Spread Signal", IEEE, 1992 pp. 171-179.
International Search Report—Appln. No. PCT/US2006/029725 Filed Jul. 28, 2006.
Carl Andren, "Short PN Sequences for Direct Sequences Spread Spectrum Radios", Apr. 11, 1997, pp. 1-4.
John Fakatselis, "Processing Gain for Direct Sequence Spread Spectrum Communication Systems and PRISM®", Intersil Corporation, 2000, pp. 1-4.
Chris Heegard et al., "High-Performance Wireless Ethernet", IEEE, Nov. 2001, pp. 64-73.
Examination and Office Action for AU 2006272473, Jan. 13, 2010.

* cited by examiner

FOR 0 OR 180 DEGREE STATE WITH 0 OR 180 DEGREE PHASE CHANGE

I MODULATED CHIP SEQUENCE:
| X(8k-6) = I(k-1)·C(8k-6) | X(8k-4) = I(k-1)·C(8k-4) | X(8k-2) = I(k-1)·C(8k-2) | X(8k) = I(k)·C(8k) | X(8k+2) = I(k)·C(8k+2) |

FIG. 17A

I MEMORY ADDRESS COUNTER:
| UP COUNT | DOWN COUNT | UP COUNT | DOWN COUNT | UP COUNT | DOWN COUNT | UP COUNT | DOWN COUNT | UP COUNT | DOWN COUNT |

← CHIP PERIOD (Tc) →

FIG. 17B

I SIGNAL CONDITION:
| X(8k-6)·X(8k-4) | X(8k-4)·X(8k-2) | X(8k-2)·X(8k) | X(8k)·X(8k+2) | X(8k+2)·X(8k+4) |

FIG. 17C

Q MODULATED CHIP SEQUENCE:
| Y(8k-5) = I(k-1)·C(8k-5) | Y(8k-3) = I(k-1)·C(8k-3) | Y(8k-1) = I(k-1)·C(8k-1) | Y(8k+1) = I(k)·C(8k+1) | Y(8k+3) = I(k)·C(8k+3) |

FIG. 17D

Q MEMORY ADDRESS COUNTER:
| DOWN COUNT | UP COUNT | DOWN COUNT | UP COUNT | DOWN COUNT | UP COUNT | DOWN COUNT | UP COUNT | DOWN COUNT | UP COUNT | DOWN COUNT |

FIG. 17E

Q SIGNAL CONDITION:
| Y(8k-5)·Y(8k-3) | Y(8k-3)·Y(8k-1) | Y(8k-1)·Y(8k+1) | Y(8k+1)·Y(8k+3) |

→ t           ↳ SYMBOL BOUNDARY

FIG. 17F

FOR 0 OR 180 DEGREE INITIAL STATE WITH +90 OR -90 DEGREE PHASE CHANGE
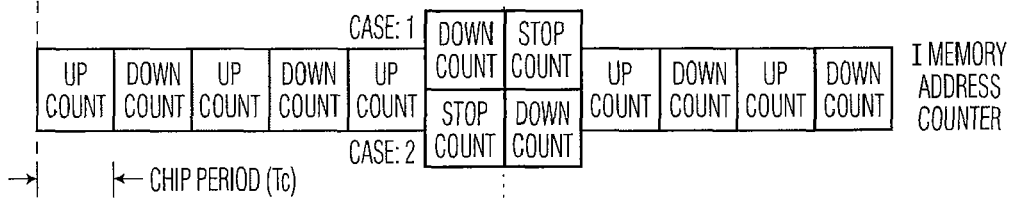
FIG. 18A
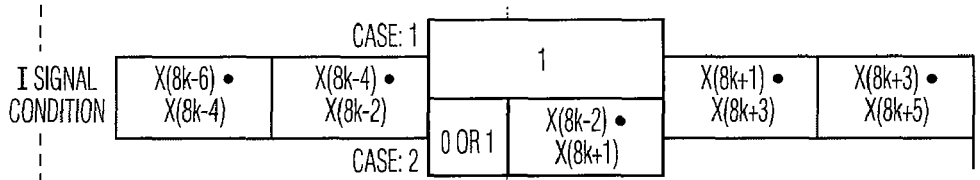
FIG. 18B
FIG. 18C
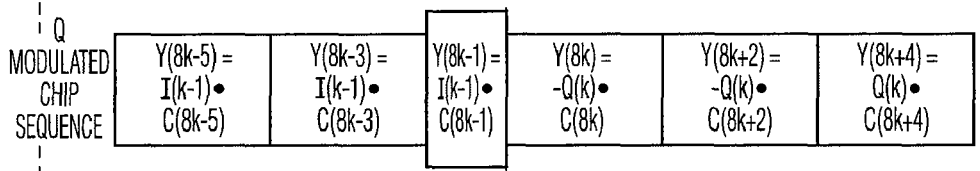
FIG. 18D
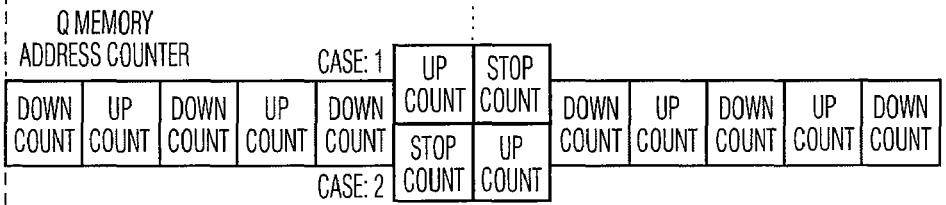
FIG. 18E
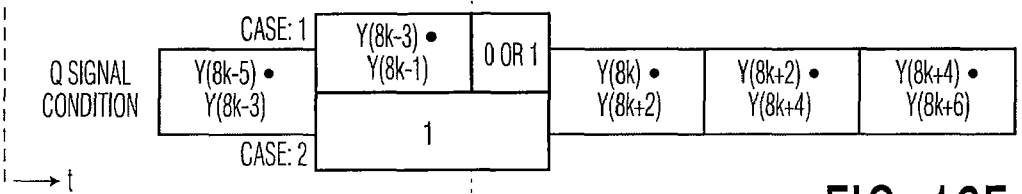
FIG. 18F

FOR A -90 OR +90 DEGREE INITIAL STATE WITH -90 OR +90 DEGREE PHASE CHANGE

I MODULATED CHIP SEQUENCE

INVERTED Q SYMBOL MULTIPLIED BY EVEN CHIPS

DELAYED I SYMBOL {I(k)} MULTIPLIED BY ODD CHIPS

Q CLOCK

Q MODULATED CHIP SEQUENCE

I/Q MEMORY ADDRESS COUNTER

⟶ t

↑— SYMBOL BOUNDARY

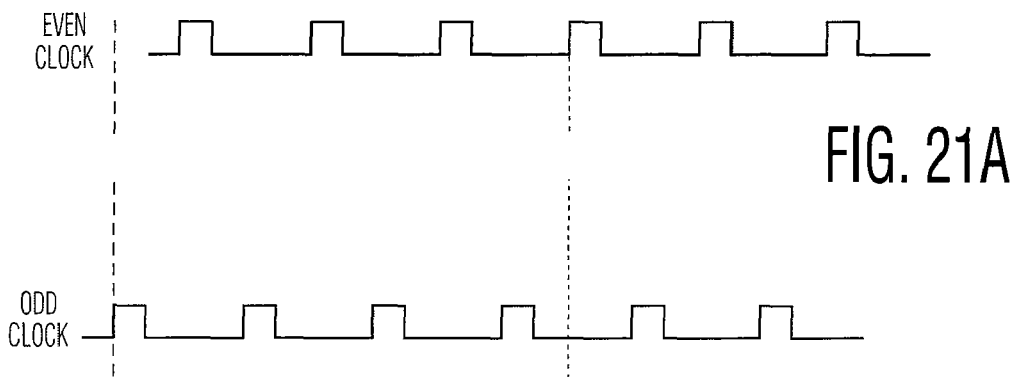
FIG. 21A
FIG. 21B
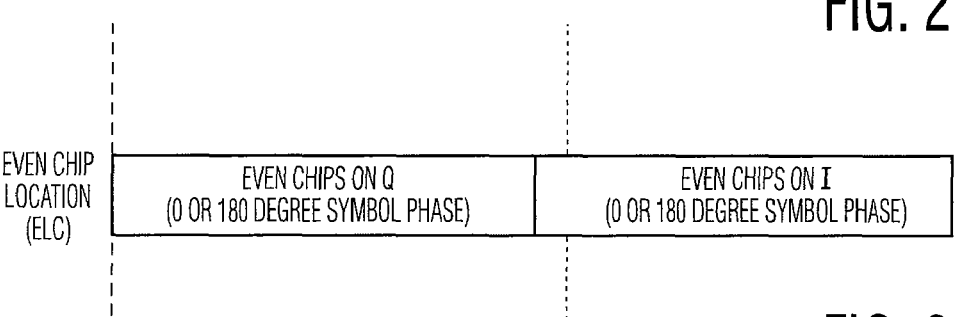
FIG. 21C
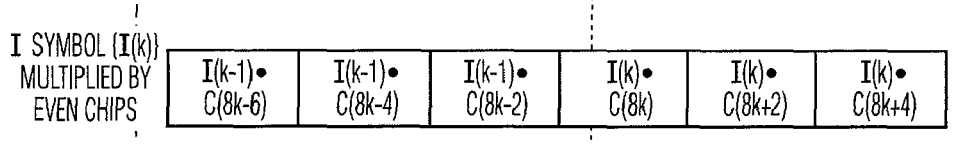
FIG. 21D
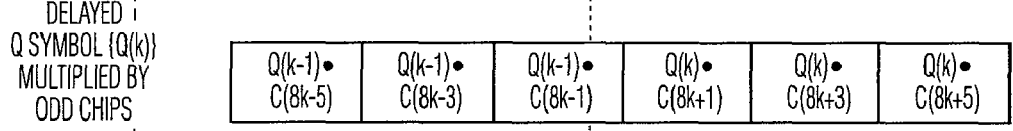
FIG. 21E
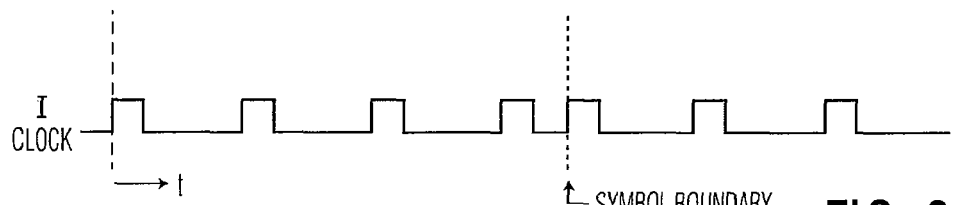
FIG. 21F I SYMBOL {I(k)} MULTIPLIED BY EVEN CHIPS

| I(k-1)•C(8k-6) | I(k-1)•C(8k-4) | I(k-1)•C(8k-2) | I(k)•C(8k) | I(k)•C(8k+2) | I(k)•C(8k+4) |

FIG. 22E

2 CHIP DELAYED Q SYMBOL {Q(k)} MULTIPLIED BY ODD CHIPS

| Q(k-1)•C(8k-5) | Q(k-1)•C(8k-3) | Q(k-1)•C(8k-1) | Q(k)•C(8k+1) | Q(k)•C(8k+3) | Q(k)•C(8k+5) |

FIG. 22F

Q SYMBOL {Q(k)} MULTIPLIED BY EVEN CHIPS

| -Q(k-1)•C(8k-6) | -Q(k-1)•C(8k-4) | -Q(k-1)•C(8k-2) | -Q(k)•C(8k) | -Q(k)•C(8k+2) | -Q(k)•C(8k+4) |

FIG. 22G

2 CHIP DELAYED I SYMBOL {I(k)} MULTIPLIED BY ODD CHIPS

| I(k-1)•C(8k-5) | I(k-1)•C(8k-3) | I(k-1)•C(8k-1) | I(k)•C(8k+1) | I(k)•C(8k+3) | I(k)•C(8k+5) |

FIG. 22H

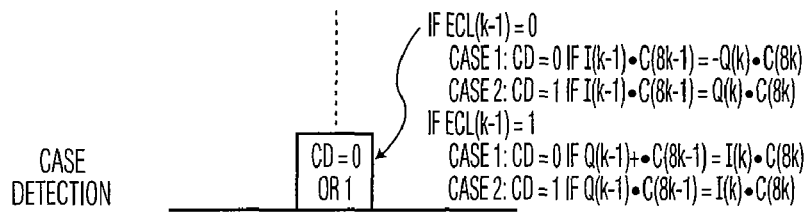

CASE DETECTION: CD = 0 OR 1

IF ECL(k-1) = 0
  CASE 1: CD = 0 IF I(k-1)•C(8k-1) = -Q(k)•C(8k)
  CASE 2: CD = 1 IF I(k-1)•C(8k-1) = Q(k)•C(8k)
IF ECL(k-1) = 1
  CASE 1: CD = 0 IF Q(k-1)•C(8k-1) = I(k)•C(8k)
  CASE 2: CD = 1 IF Q(k-1)•C(8k-1) = I(k)•C(8k)

FIG. 22I

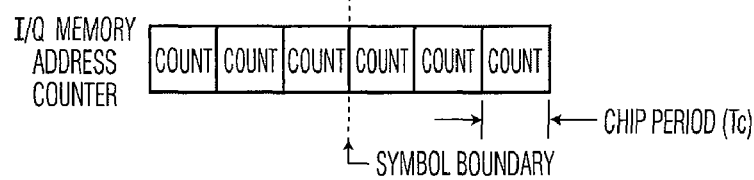

I/Q MEMORY ADDRESS COUNTER

| COUNT | COUNT | COUNT | COUNT | COUNT | COUNT |

CHIP PERIOD (Tc)
SYMBOL BOUNDARY

FIG. 22J

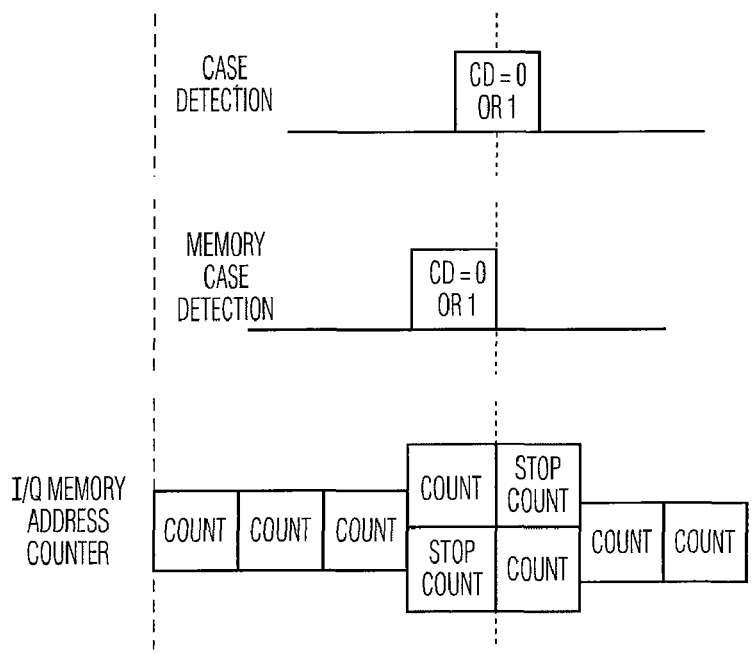
FIG. 23A
FIG. 23B
FIG. 23C
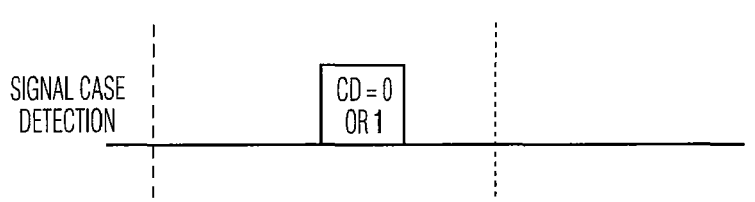
FIG. 23D
ECL(k) = 0 IF EVEN CHIPS ON I SIGNAL
ECL(k) = 1 IF EVEN CHIPS ON Q SIGNAL
FIG. 23E
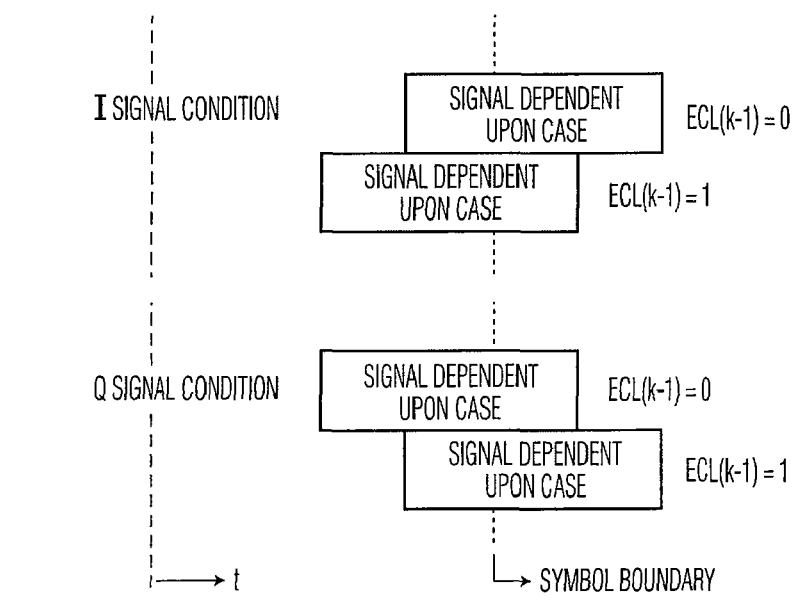
FIG. 23F
FIG. 23G

FIG. 24A

I MODULATED CHIP SEQUENCE:
| X(8k-6) = I(k-1)·C(8k-6) | X(8k-4) = I(k-1)·C(8k-4) | X(8k-2) = I(k-1)·C(8k-2) | X(8k+1) = Q(k)·C(8k+1) | X(8k+3) = Q(k)·C(8k+3) |

FIG. 24B

I MODULATED CHIP SEQUENCE DELAYED Tc:
| X(8k-6) = I(k-1)·C(8k-6) | X(8k-4) = I(k-1)·C(8k-4) | X(8k-2) = I(k-1)·C(8k-2) | X(8k+1) = Q(k)·C(8k+1) | X(8k+3) = Q(k)·C(8k+3) |

FIG. 24C

I MODULATED CHIP SEQUENCE ADVANCED Tc:
| X(8k-4) = I(k-1)·C(8k-4) | X(8k-2) = I(k-1)·C(8k-2) | X(8k+1) = Q(k)·C(8k+1) | X(8k+3) = Q(k)·C(8k+3) | X(8k+5) = Q(k)·C(8k+5) |

FIG. 24D

I SIGNAL CONDITION:
| X(8k-6)·X(8k-4) | X(8k-4)·X(8k-2) | CASE 1: 1 / CASE 2: 1, X(8k-2)·X(8k+1) | X(8k+1)·X(8k+3) | X(8k+3)·X(8k+5) |

FIG. 24E

Q MODULATED CHIP SEQUENCE:
| Y(8k-5) = I(k-1)·C(8k-5) | Y(8k-3) = I(k-1)·C(8k-3) | Y(8k-1) = I(k-1)·C(8k-1) | Y(8k) = -Q(k)·C(8k) | Y(8k+2) = -Q(k)·C(8k+2) | Y(8k+4) = Q(k)·C(8k+4) |

→ t

SYMBOL BOUNDARY

PHASE MAPPING FOR QPSK/QBL-MSK WAVEFORM

CROSS REFERENCE TO RELATED APPLICATIONS

This application claims priority of U.S. Provisional Patent Application Ser. No. 60/703,179, filed Jul. 28, 2005.

STATEMENT REGARDING FEDERALLY SPONSORED RESEARCH

This invention was made with Government Support Under Agreement No. DAAB07-03-9-K601 awarded by the United States Army. The Government has certain rights in the invention.

FIELD OF THE INVENTION

The present invention relates, in general, to the field of communication. More specifically, it relates to spread-spectrum communication. Still more specifically, it relates to phase mapping of modulated sequence spread signals.

BACKGROUND OF THE INVENTION

Disclosure of the present invention is facilitated by U.S. Pat. No. 5,818,867 issued on Oct. 6, 1998 to Donald J. Rasmussen, which is hereby incorporated by reference.

Quasi-bandlimited minimum shift keying (QBL-MSK) pulse-shaping proposed by Frank Amoroso provides a significant improvement in modulator spectral efficiency over standard MSK when operated with a linear power amplifier. Since QBL-MSK is not a constant envelope modulation waveform, nonlinear Class C power amplifications results in regrowth in the spectrum sidelobe levels. Spectral efficiency is lost by this regrowth process. Amoroso has shown that QBL-MSK offers significant improvement in spectral efficiency over standard MSK even with sidelobe regrowth. QBL-MSK pulse-shaping has been applied to spread spectrum radios by D. J. Rasmussen using binary phase shift keying (BPSK) to convey data information. By using BPSK data modulation, the QBL-MSK waveform structure is unmodified. Therefore, the spectrum results generated by Amoroso can be directly applied to the spread spectrum signal. Spreading is easily applied to the BPSK data modulation by using an exclusive-or device. FIG. 1 shows the power spectrum for BPSK/QBL-MSK at 4.8 Mcps with 16 chips per symbol, using a 12 bit digital-to-analog converter (DAC) with nonlinear amplifications.

Quadrature phase shift keying (QPSK) data modulation is used to increase the data rate capability over binary phase shift keying BPSK data modulation. Data capability is increased by a factor of 2 using QPSK. QPSK data modulation does modify the spread spectrum QBL-MSK waveform. FIG. 2 shows the block diagram for the QPSK/QBL-MSK modulation. Details of the system shown in FIG. 2 is given in U.S. Pat. No. 5,818,867. The modulation waveform is structured to allow use of a serial demodulation approach. Because QPSK data modulation modifies the spread spectrum QBL-MSK waveform, Amoroso's nonlinear results are not valid for this waveform. This new waveform has conditions in which the RF envelope goes close to or equals zero.

A signal condition in which the RF envelope deviation is minimal is shown in FIGS. 3A, 3B and 3C. For this condition, the QPSK data modulation does not have a significant impact on the QBL-MSK spreading waveform. FIGS. 4A, 4B and 4C show a signal condition in which the RF envelope deviation is severe. For this condition the RF envelope goes to zero, which is undesirable for a near constant envelope modulation waveform, like QBL-MSK. These large RF envelope deviations result in increased sidelobe level regrowth for nonlinear Class C power amplification. Sidelobe regrowth can be significantly reduced by using a Class AB power amplifier and backing off on the input drive level. This approach gives improved spectral efficiency at a price of power efficiency.

For BPSK data modulation, the SQBL-MSK spreading signal is not impacted by the data modulation. For QPSK data modulation, the SQBL-MSK spreading signal is impacted by the data modulation at the symbol boundary conditions, when either a $-0.5\pi$ ($-90$ degree) or $0.5\pi$ ($90$ degree) phase change between symbols is being made. Two different 90 degree phase changes associated with QPSK data modulation, in which the past QPSK symbol is at 0 degrees and the present QPSK symbol is at 90 degrees are examined to show two significantly different RF envelope effects. Minimal RF envelope deviation, as shown in FIGS. 3A, 3B and 3C, results when the I and Q signals do not go to zero at the same point in time. Severe RF envelope distortion, however, as shown in FIGS. 4A, 4B and 4C, results when both the I and Q signals go to zero at the same point in time, causing the RF envelope to go to zero. As clearly shown in FIGS. 4A, 4B and 4C, the near constant RF envelope performance of SQBL-MSK is not preserved. To preserve the near constant RF envelope performance of SQBL-MSK, a phase mapping process is performed to prevent the severe RF envelope deviation condition. The phase mapping process changes the phase trajectory only about the symbol boundary, when either a $-90$ or $90$ degree phase change occurs. This mapping prevents the severe RF envelope condition shown in FIGS. 4A, 4B and 4C.

FIG. 5 shows a block diagram of a QPSK/QBL-MSK modulator with phase mapping module 10 added to prevent the RF envelope from going close to or equal to zero. A phase mapping operation by module 10 is performed between serial formatting module 24 and QBL pulse-shaping modules 27. A description of phase module 10 is provided in U.S. Pat. No. 5,818,867 and incorporated herein by reference.

FIG. 6 shows a top level block diagram of phase mapping module 10. This module compares the present and past data modulated chips of both the I and Q signals to determine if they are inverted. If the data modulated chips are inverted on both the I and Q signals, the RF envelope will either go to zero or close to it. To prevent this undesirable condition for the RF envelope, module 10 inverts both the I and Q signals.

FIG. 7 shows the resulting power spectrum for the QPSK/QBL-MSK waveform with phase mapping using a 12 bit DAC for nonlinear power amplification at a 4.8 Mcps chip rate with 8 chips per symbol. Comparing these results using phase mapping by module 10 to those for BPSK data modulation shown in FIG. 1, the spectral regrowth is only slightly higher than that obtained for the BPSK data modulation.

The phase mapping shown in FIG. 6, by inverting the modulated chips, improves the power spectrum, but results in a reduction in the spreading gain by two chips. Two chips of processing gain are lost, since the inverted chip reduces the number for chip agreements by one with the additional 1 chip degradation introduced by inverted chip contribution to the symbol accumulation. For spreading ratios greater than 32 chips per symbol, the process gain degradation for the severe RF envelope condition is less than 0.3 dB. With increasing processing gain, this loss becomes smaller. For a 16 chips/symbol system this degradation is less than 0.6 dB. An 8 chips/symbol system this degradation is approximately 1.25 dB. For lower spreading gain of 8 chips per symbol, the degradation is greater than 1 dB. It is desirable to reduce this loss to less than 1 dB, because a lower spreading gain signal may then be used to increase data rate, which typically requires a higher operational Es/No to achieve acceptable bit error rate (BER) performance. To reduce this degradation, a mapping that does not invert both chips is required, and is provided by the present invention.

SUMMARY OF THE INVENTION

To reduce the processing gain degradation and table lookup complexity a new phase mapping is performed at the symbol boundary, which reduces processing gain degradation and look-up table complexity.

An embodiment of the present invention includes a method of pulse shaping a modulated sequence spread signal having serially formatted in-phase (I) and quadrature (Q) waveforms, each waveform including a predetermined number of chips per symbol. The method includes the steps of: examining adjacent chips of the I and Q waveforms at a symbol boundary; determining that one of the I or Q waveforms, at the symbol boundary, includes two adjacent first and second chips separated by a single chip period, where the first chip belongs to a previous symbol and the second chip belongs to a present symbol; and extending, for the one chip period, a peak value of the first chip. Extending the peak value of the first chip provides a flat-portion between the first chip and the second chip. The method also includes the step of zeroing the other waveform of the I or Q waveform during the extended duration of the flat-portion.

Another embodiment of the invention includes a method of pulse shaping a modulated sequence spread signal having serially formatted in-phase (I) and quadrature (Q) waveforms, each waveform including a predetermined number of chips per symbol. The method includes the steps of: (a) examining adjacent chips of the I and Q waveforms at a symbol boundary; (b) determining that one of the I or Q waveforms, at the symbol boundary, includes two adjacent first and second chips separated by a single chip period, where the first chip belongs to a previous symbol and the second chip belongs to a present symbol; (c) determining that the first and second chips are of opposite value; and (d) zeroing one of the first chip or second chip, if both steps (b) and (c) are determined. The method also includes the steps of: (e) inserting a chip into the other waveform of the I or Q waveform, during the duration of the one pulse zeroed in step (d), wherein the inserted chip has a value that is the same as an immediately previous chip value; and (f) extending a peak value between the immediately previous chip and the inserted chip to provide a flat-top there-between. Step (b) may include determining that the Q waveform includes the two adjacent first and second chips separated by a single chip period, and step (d) may include zeroing the first chip. Alternatively, step (b) may include determining that the I waveform includes the two adjacent first and second chips separated by a single chip period, and step (d) may include zeroing the first chip.

Yet another embodiment of the invention includes a method of pulse shaping a modulated sequence spread signal having serially formatted in-phase (I) and quadrature (Q) waveforms, each waveform including a predetermined number of chips per symbol. The method includes the steps of: (a) examining adjacent chips of the I and Q waveforms at a symbol boundary; (b) determining that one of the I or Q waveforms, at the symbol boundary, includes two adjacent first and second chips separated by a single chip period, where the first chip belongs to a previous symbol and the second chip belongs to a present symbol; (c) determining whether the first and second chips are of the same value; (d) if step (c) determines that the chips are of the same value, then extending a peak value between the first and second chips, and zeroing the other waveform of the I or Q waveform during the extended duration of the peak value; and (e) if step (c) determines that the chips are of opposite values, then zeroing one of the first chip or second chip, and inserting a chip into the other waveform of the I or Q waveform during the duration of the zeroed one pulse. Step (e) may include inserting the chip into the other waveform, wherein the inserted chip has a value that is the same as an immediately previous chip value; and extending a peak value between the immediately previous chip and the inserted chip to provide a flat-top there-between.

BRIEF DESCRIPTION OF THE DRAWING

The invention is best understood from the following detailed description when read in connection with the accompanying drawings. Included in the drawings are the following features:

FIG. 17 shows a timing diagram of the I and Q modulated chip sequences, for a first condition, as they are mapped in the modulator of FIG. 16;

FIG. 18 shows a timing diagram of the I and Q modulated chip sequences, for a second condition, as they are mapped in the modulator of FIG. 16;

FIG. 23 is a timing diagram showing the timing difference among the case detection, memory case detection, and I and Q signal conditions with respect to a symbol boundary, as implemented in the embodiment of FIG. 16;

DETAILED DESCRIPTION OF THE INVENTION

Figure 8:
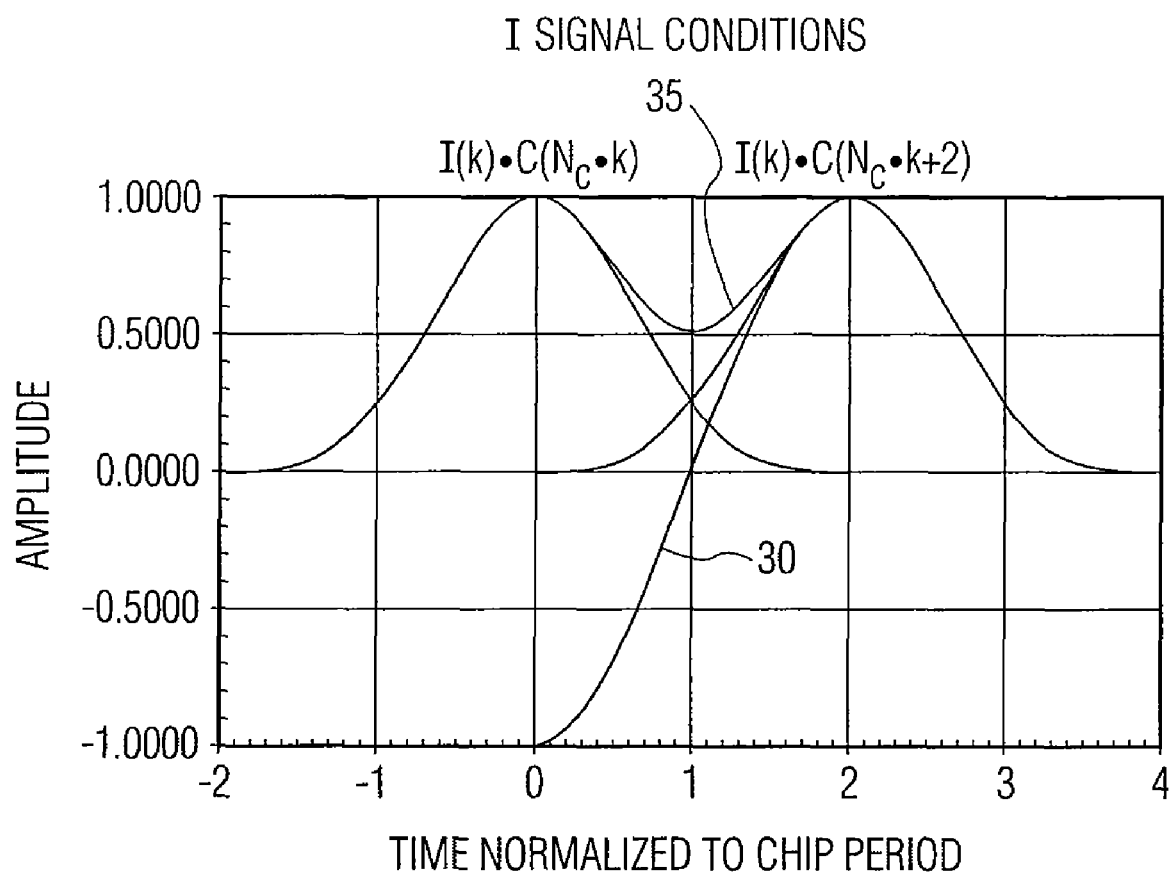
FIG. 8 shows two unique conditions for the I signal.

The phase mapping of the present invention requires four signal states in the QBL-MSK modulator. FIG. 8 shows two unique conditions for the I signal, over time interval 0 to $2T_C$, where $T_C$ is the chip period. FIG. 8 also shows the chip pulses that make up the two unique signal conditions. From these two conditions the four possible I signals can be generated by either inverting or not-inverting one of the two signal conditions. Since the Q signal is a time shift version of the I signal, by a chip period, with the Q data and Q chips multiplying the chip pulses, the same approach can be used to generate four possible Q signals within each chip period. This approach allows use of a look-up table (LUT) to implement the mapping performed by the present invention. For BPSK data modulation, the signal structure does not change with the data modulation. For QPSK data modulation with phase mapping, the signal structure, at the symbol boundaries, is affected by the data modulation when either a −90 or 90 degree change occurs.

Figure 9A:
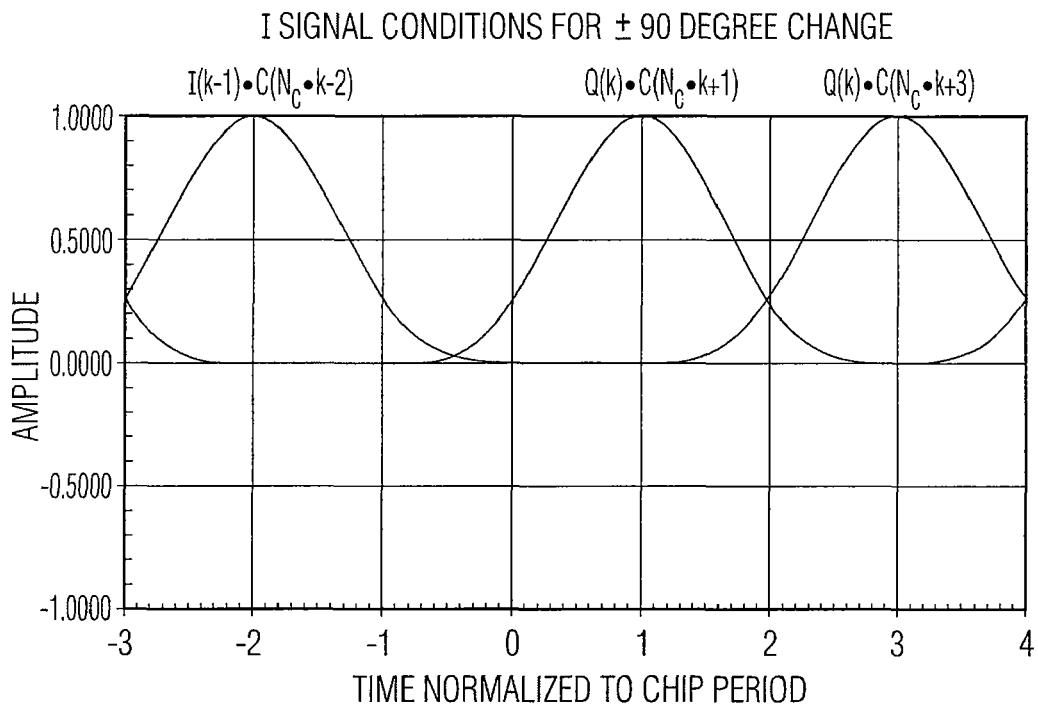
FIGS. 9A and 9B show the I and Q signals for a ±90 degree phase change when the past symbol is at either 0 or 180 degrees.
Figure 9B:
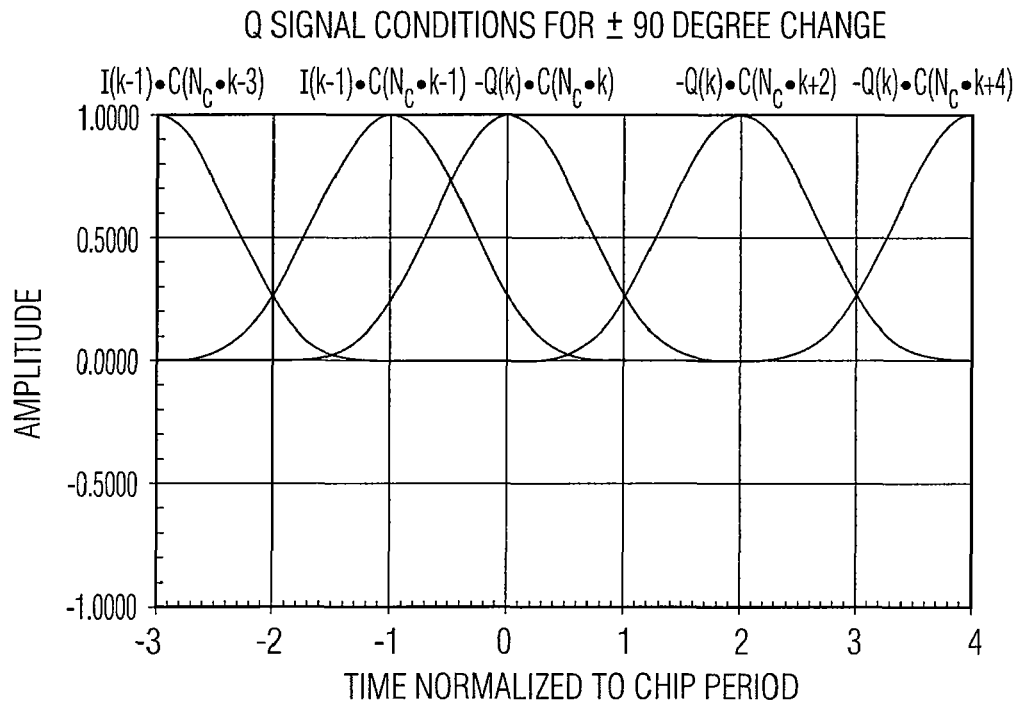

FIGS. 9A and 9B show the I and Q signals for a ±90 degree change when the past symbol is at either 0 or 180 degrees. A 90 degree change, when the past symbol is either at −90 or 90 degrees, results in the Q signal, shown in FIG. 9B, being on the I side and the I signal, shown in FIG. 9A, being on the Q side. Examining FIGS. 9A and 9B shows that two unique signal conditions for signal I that span 3 chip period (−2$T_C$ to $T_C$ as shown in FIGS. 9A and 9B) are required. By inverting or non-inverting these two signal conditions, the four possible signals are generated. For the Q signal, three unique signal condition over the 3 chip period (−2$T_C$ to $T_C$ as shown in FIGS. 9A and 9B) are required, since the phase mapping forces $I(k-1) \cdot C(N_C \cdot k-1) = -Q(k) \cdot C(N_C \cdot k)$. By inverting or non-inverting these three signal conditions, the six possible signals are generated. The additional number of signal conditions introduced at the symbol boundary condition increases the size of the look-up table. Generating a new phase mapping that reduces the look-up table size while minimizing any processing gain degradation is desired.

As will be explained, the present invention reduces the look-up table size and reduces the processing gain degradation associated with using QPSK or differential QPSK (DQPSK) data modulation on a serial direct sequence spread waveform, like QBL-MSK, by providing a phase mapping process. The phase mapping process used for QPSK/DQPSK can be expanded to include higher orders of phase modulation, like 8-PSK and differential 8-PSK. Also, the phase mapping process can be applied to π/4-QPSK or differential π/4-QPSK data modulation on a serial direct sequence spread waveform like QBL-MSK. Besides enabling changes to the data modulation type, the phase mapping process can be used by applying serial formatting to other quadrature spreading modulation waveforms like offset quadrature phase shift keying (OQPSK), minimum shift keying (MSK), Gaussian MSK, tamed frequency modulation (TFM), intersymbol jitter free offset quadrature phase shift keying (IJF-OQPSK), raised cosine filtered offset quadrature phase shift keying (RC-OQPSK), and bandwidth efficient continuous phase modulation (CPM).

Figure 14A:
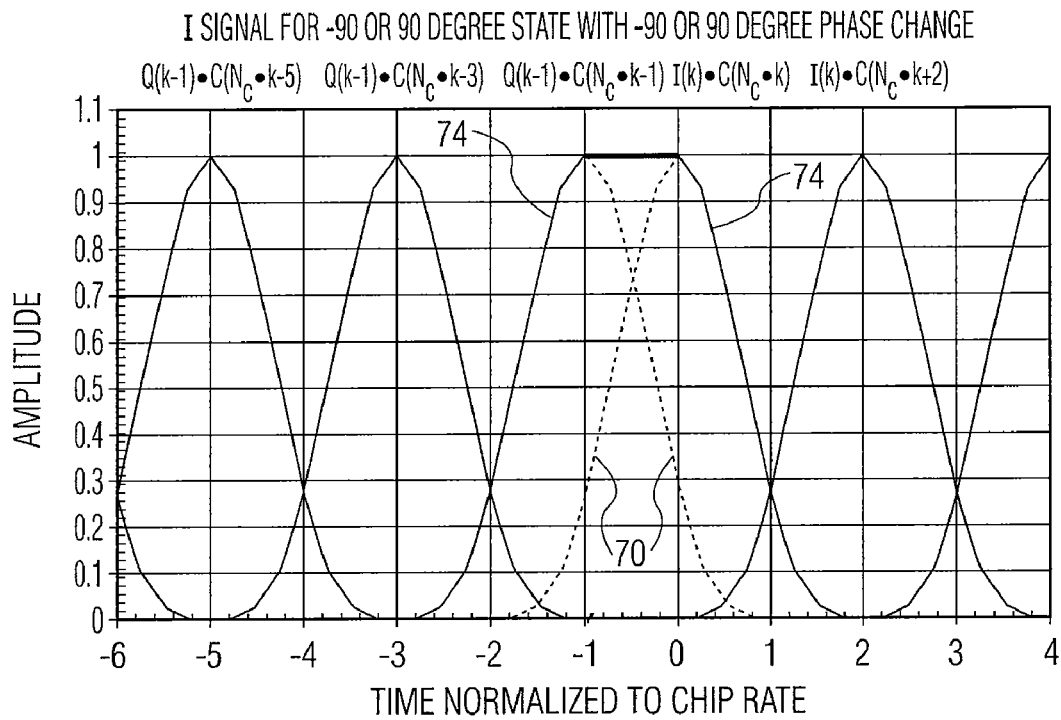
FIGS. 14A and 14B show modulated chip pulse shaped sequences about the symbol boundary for a third state, as they are mapped using an embodiment of the present invention.
Figure 14B:
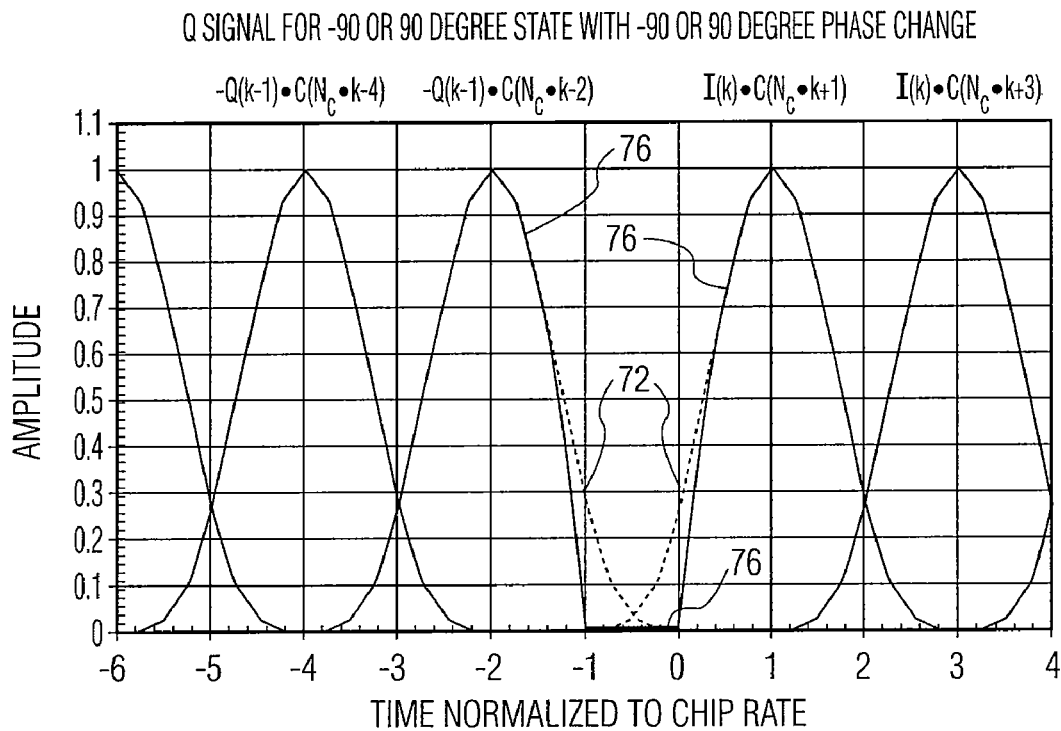
Figure 15A:
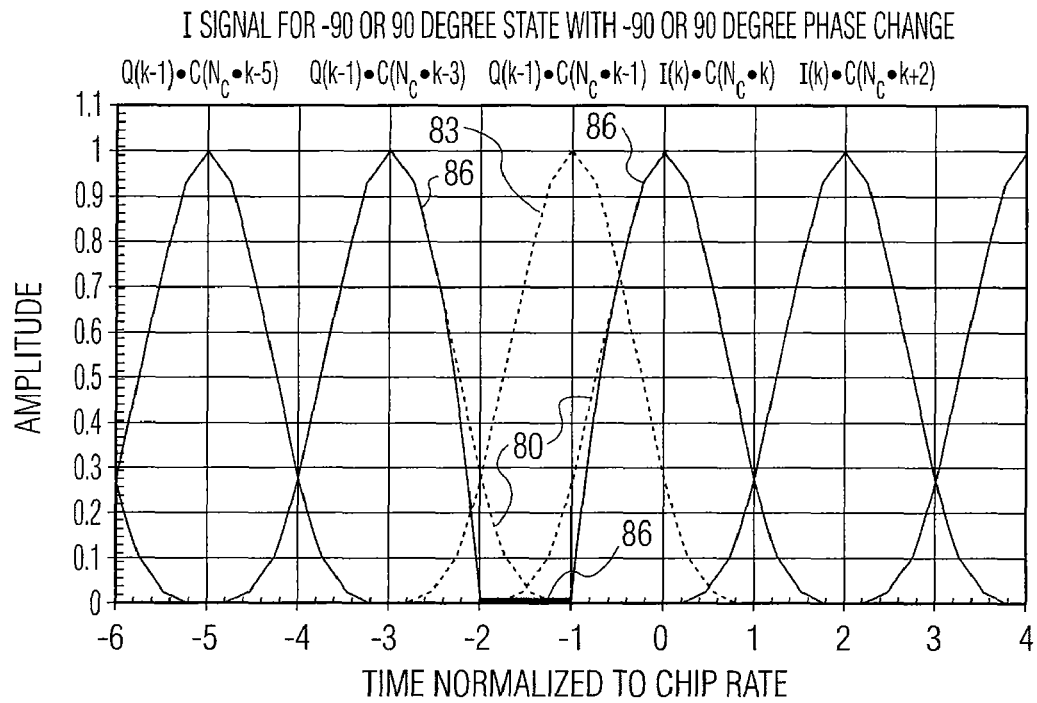
FIGS. 15A and 15B show modulated chip pulse shaped sequences about the symbol boundary for a fourth state, as they are mapped using an embodiment of the present invention.
Figure 15B:
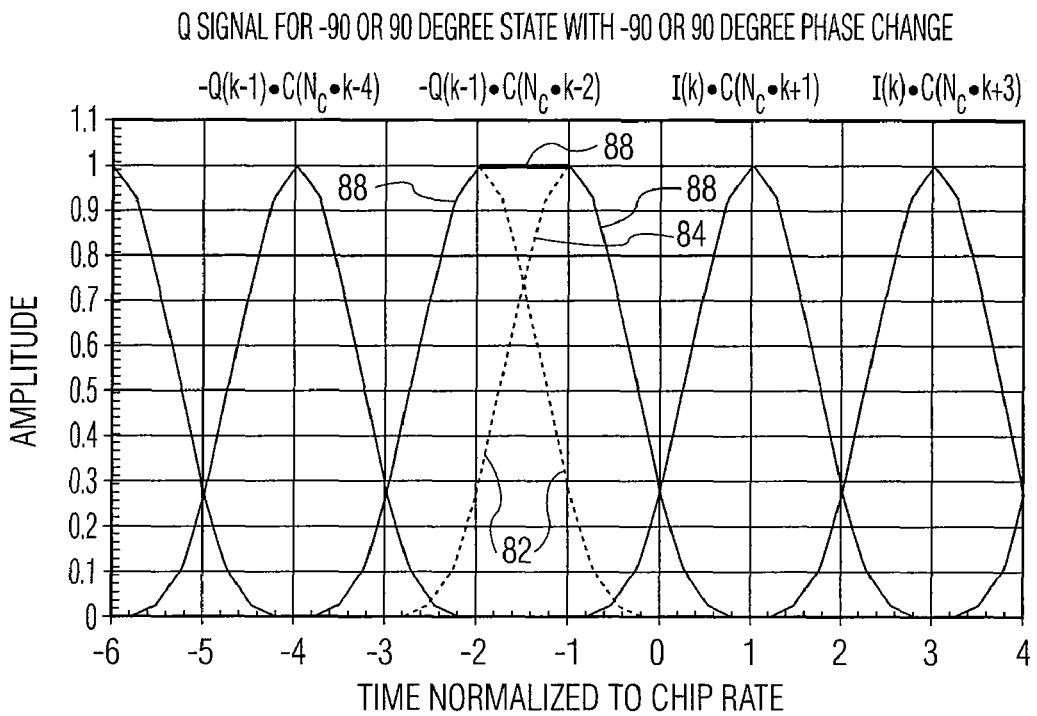

The following four different signal boundary conditions (states) are examined:

1) 0 or 180 degree initial state with a −90 or +90 degree phase change with the modulated serial formatted Q chips separated by a single chip period equal in value (see FIGS. 12A and 12B).
2) 0 or 180 degree initial state with a −90 or +90 degree phase change with the modulated serial formatted Q chips separated by a single chip period opposite in value (see FIGS. 13A and 13B).
3) −90 or 90 degree initial state with a −90 or +90 degree phase change with the modulated serial formatted I chips separated by a single chip period equal in value (see FIGS. 14A and 14B).
4) −90 or 90 degree initial state with a −90 or +90 degree phase change with the modulated serial formatted I chips separated by a single chip period opposite in value (see FIGS. 15A and 15B).

It will be shown that signal conditions 3 and 4 are the same as signal conditions 1 and 2, except that the signals on the I and Q side are flipped. Details of how conditions 3 and 4 are the same as conditions 1 and 2 are given below.

Figure 10A:
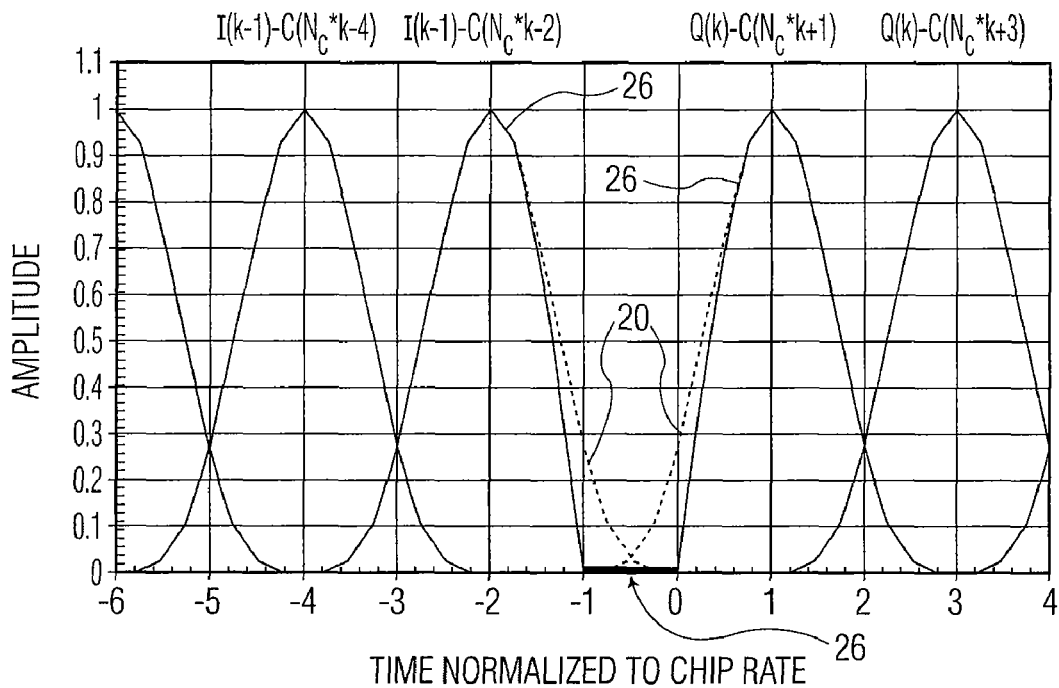
FIGS. 10A and 10B show modulated chip pulse shaped sequences for one condition (case 1) about the symbol boundary, as they are mapped using an embodiment of the present invention.
Figure 10B:
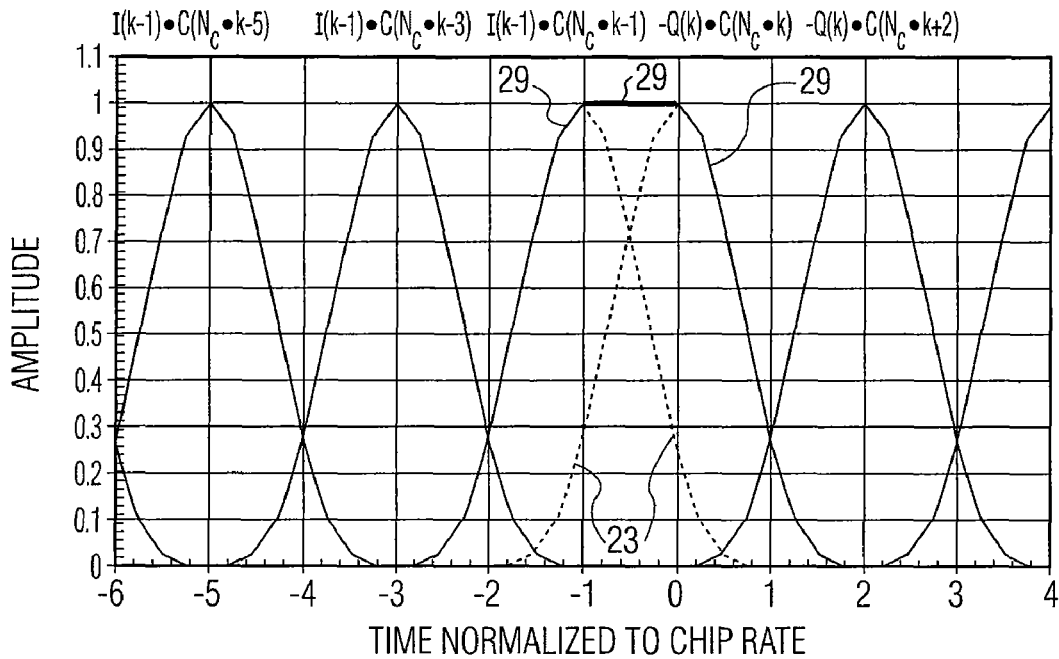

In general, two different cases (case 1 and case 2) are described below (case 1 corresponds to conditions (states) 1 and 3 and case 2 corresponds to conditions (states) 2 and 4). The modulated chip pulse shaped sequences about the symbol boundary for case 1 are shown in FIGS. 10A and 10B for a 4 sample per chip digital implementation of the waveform. Since case 1 corresponds to $I(k-1) \cdot C(N_C \cdot k-1) = -Q(k) \cdot C(N_C \cdot k)$, the severe RF envelope deviation is prevented. It should be noted that C(k) is the serial formatted chip, which is the chip value $c_k$ times the $-1^k$ serial formatting. The dotted line modulated pulse shapes 20 and 23 at the boundary are the standard chip pulses that would be implemented. Instead of implementing these standard chip pulses, the dark highlighted chip pulses 26 and 29 are implemented by the present invention. Thus, for the I signal, the standard two unique signal mapping is used up to −2 chips from the symbol boundary (at 0) and 1 chip after the symbol boundary. Between −2$T_C$ to −$T_C$ and also 0 to $T_C$, the I signal is implemented by using the unique signal mapping for a change between two adjacent modulated chips (refer to the curves in FIG. 8). Since this condition goes to zero at time −$T_C$ and 0, the I signal between $-T_C$ and 0 is set to zero by the present invention, as shown in FIG. 10A. The highlighted pulse shaping, designated as 26, for the I signal shown in FIG. 10A, is the modified I signal structure.

For the Q signal, the standard two unique signal mapping is used up to −2 chips from the symbol boundary (at 0) and 1 chip after the symbol boundary. To simplify the mapping between $-2T_C$ to $-T_C$ and also 0 to $T_C$, the dotted chip pulses 23 are not included in the Q signal. This allows the Q signal between $-2T_C$ to $-T_C$ and also 0 to $T_C$ to be implemented with the standard unique signal mapping (refer to the curves shown in FIG. 8). For case 1, where $I(k-1)\cdot C(N_C\cdot k-1)=-Q(k)\cdot C(N_C\cdot k)$, the Q signal equals either +1 or −1 at both times $-T_C$ and 0. Since the Q signal condition goes to either a value of +1 or −1 at times $-T_C$ and 0, the Q signal between $-T_C$ and 0 is set equal to the appropriate +1 or −1 signal level by the present invention. The highlighted pulse shaping, designated as 29, for the Q signal shown in FIG. 10B is the modified Q signal structure. Since this new waveform mapping is based on the standard two signal conditions combined with a fixed peak level of +1, −1, or level 0, which is already in the look-up table, its implementation is significantly reduced.

Figure 11A:
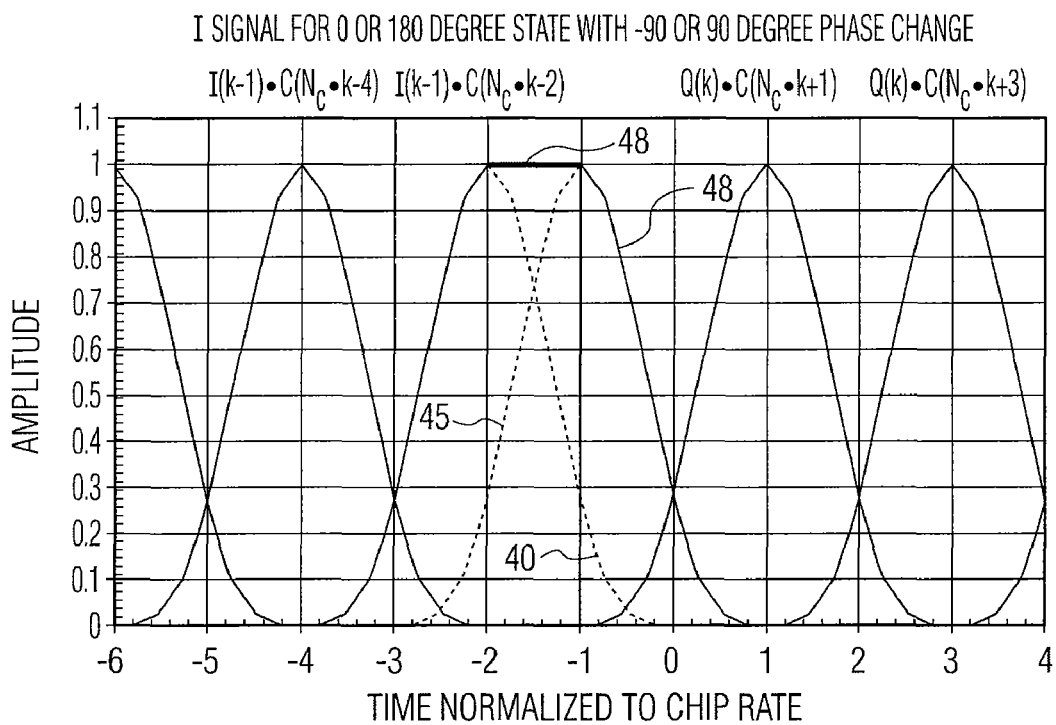
FIGS. 11A and 11B show modulated chip pulse shaped sequences for another condition (case 2) about the symbol boundary, as they are mapped using an embodiment of the present invention.
Figure 11B:
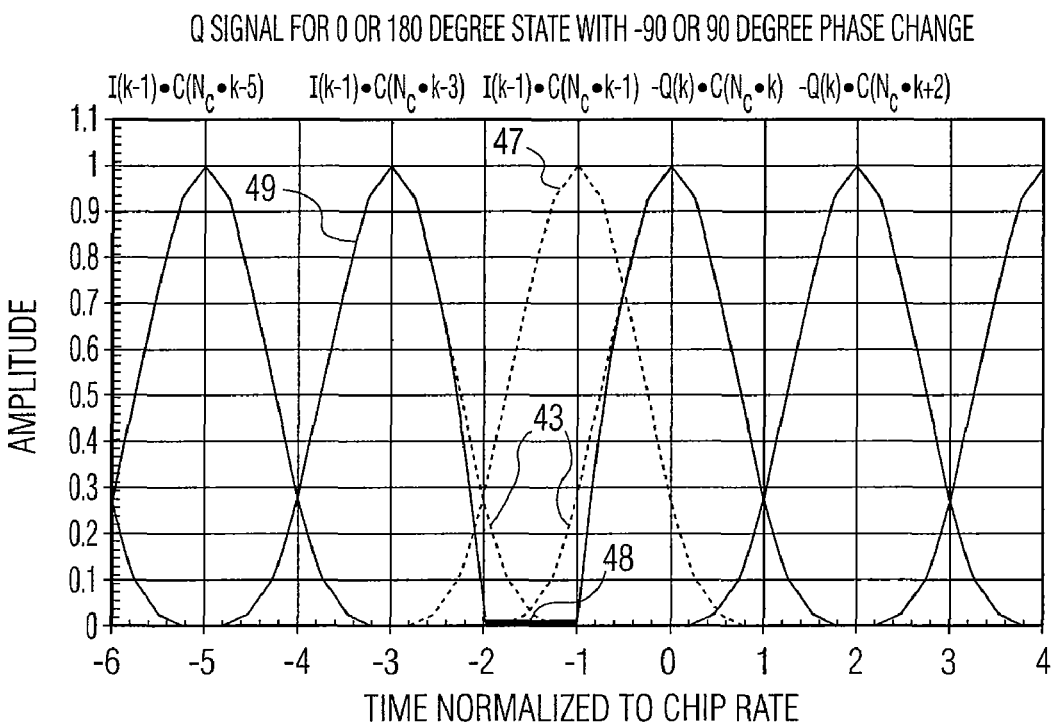

The modulated chip pulse shaped sequences about the symbol boundary for case 2 are given in FIGS. 11A and 11B for a 4 sample per chip digital implementation of the waveform. Since case 2 corresponds to $I(k-1)\cdot C(N_C\cdot k-1)=Q(k)\cdot C(N_C\cdot k)$, the severe RF envelope deviation condition exists. The dotted line modulated pulse shapes 40, 43 and 47 (really negative) at the boundary are the standard chip pulses that would be implemented, except for the I signal where chip pulse 45 is inserted at $-T_C$ by the present invention. The inserted chip pulse is multiplied by $I(k-1)\cdot C(N_C\cdot k-2)$, so a constant +1 or −1 peak signal level is maintained from time $-2T_C$ to $-T_C$. Instead of implementing the standard chip pulses (dotted lines), the dark highlighted chip pulses are implemented (shown as 48 in FIGS. 11A and 11B).

For the I signal, the standard two unique signal mapping is used up to −3 chips from the symbol boundary (at 0) and after the symbol boundary. To simplify the mapping between $-3T_C$ to $-2T_C$ and also $-T_C$ to 0, the dotted chip pulses are not included in the I signal. This allows the I signal between $-3T_C$ to $-2T_C$ and also $-T_C$ to 0 to be implemented with the standard unique signal mapping (refer to curves 35 and 30 shown in FIG. 8). Since the inserted chip pulse is equal to the overlapping chip pulse $\{I(k-1)\cdot C(N_C\cdot k-2)\}$, the I signal equals either a peak of +1 or −1 at time $-2T_C$ and $-T_C$. Since the I signal condition goes to either a peak value of +1 or −1 at time $-2T_C$ and $-T_C$, the I signal between $-2T_C$ and $-T_C$ is set equal to the appropriate +1 or −1 peak signal level by the present invention. The highlighted pulse shaping for the I signal given in FIG. 11A shows the modified I signal structure.

For the Q signal shown in FIG. 11B, the standard two unique signal mapping would be used up to −3 chips from the symbol boundary (at 0) and 1 chip after the symbol boundary. Unlike the chip insertion with the I signal, the Q chip pulse 47 centered at $-T_C$ is deleted from the Q data modulation chip pulse sequence. The dotted line modulated pulse shapes 43 and 47 at the boundary are the standard chip pulses that would be implemented, except for the Q signal where chip pulse 47 is deleted at $-T_C$. Between $-3T_C$ to $-2T_C$ and also $-T_C$ to 0, the Q signal is implemented by using the unique signal mapping for a change between two adjacent modulated chips (refer to the curves shown in FIG. 8). Since this condition goes to zero at time $-2T_C$ and $-T_C$, the Q signal between $-2T_C$ and $-T_C$ is set to zero by the present invention, as shown in FIG. 11B. The highlighted pulse shaping 48 for the Q signal, shown in FIG. 11B, is the modified Q signal structure. Since this new waveform mapping is based on the standard two signal condition combined with a fixed level of +1, −1, or 0, its implementation in a look-up table is reduced.

The new phase mapping implemented by the present invention reduces the complexity of the look-up table by using the standard two unique signal conditions to build the signal along with the +1, −1, and 0 values stored in the table. Since the severe RF envelope condition is prevented by deleting a data modulated chip versus inverting a data modulated chip, the processing gain for that condition is reduced by only a single chip versus two chips.

Serial QBL-MSK is used for the spreading modulation to provide a near constant RF envelope modulation and enable a serial despreading structure to be used. Although QBL-MSK is selected as the spreading waveform, other constant or near constant envelope modulations such as MSK, Gaussian MSK, OQPSK, RC-OPSK, and others may be used for the spreading modulation. The serial despreading structure provides a simplified BPSK despreading operation based on the spreading code versus the parallel despreading structure, which separates the despreading code into an inphase (I) and quadrature (Q) despreading code. By using the serial despreading structure, the chip to symbol rate for QPSK may be reduced to 8 chips/symbols. It will be appreciated that lower spreading ratios are desired for obtaining higher data rates, when the communication channel supports it. For BPSK or QPSK data modulation on SQBL-MSK, the spread modulation waveform can be written as follows:

$$s(t) = \sum_{k=0}^{N} \left\{ \left[ \sum_{i=0}^{M-1} (-1)^i c_{2i+2kM} \cdot p(t - [2i+2kM]T_c) \right] \cos(2\pi f_o t + \theta_k) + \left[ \sum_{i=0}^{M-1} (-1)^i c_{2i+2kM+1} \cdot p(t - [2i+2kM+1]T_c) \right] \sin(2\pi f_o t + \theta_k) \right\} \quad \text{(eqn 1)}$$

and $$p(t) = \begin{cases} \left[ \dfrac{\sin\left(\dfrac{\pi t}{2T_c}\right)}{\left(\dfrac{\pi t}{2T_c}\right)} \right]^3 ; & -2T_c \le t \le 2T_c \\ 0; & \text{elsewhere.} \end{cases} \quad \text{(eqn 2)}$$

For the data modulated SQBL-MSK waveform equation given above, $T_C$ represents the chip period, $c_i$ represents the chip at time $iT_C$, 2M is the number of chips per data symbols in the modulated signal, p(t) is the QBL pulse-shaping function, $f_o$ is the carrier center frequency, and the $(-1)^i$ terms which multiplies the chip value represents the serial formatting. The chips ($c_i$) which spread the data modulated symbols (BPSK or QPSK) takes on either a +1 or −1 value. The data modulation (BPSK or QPSK) is represented by the $\theta_k$ carrier phase term, which is either 0 or $\pi$ for BPSK data modulation and either $-0.5\pi$, 0, $0.5\pi$, or $\pi$ for QPSK data modulation. Applying differential encoding to either the BPSK or QPSK data modulation does not impact this equation, just the mapping to the carrier phase term given by the following equation:

$$\theta_k = \sum_{m=0}^{k} \Delta\theta_m; \quad \text{(eqn 3)}$$

where $\Delta\theta$ is the phase change introduced by the differential encoding.

Figure 1:
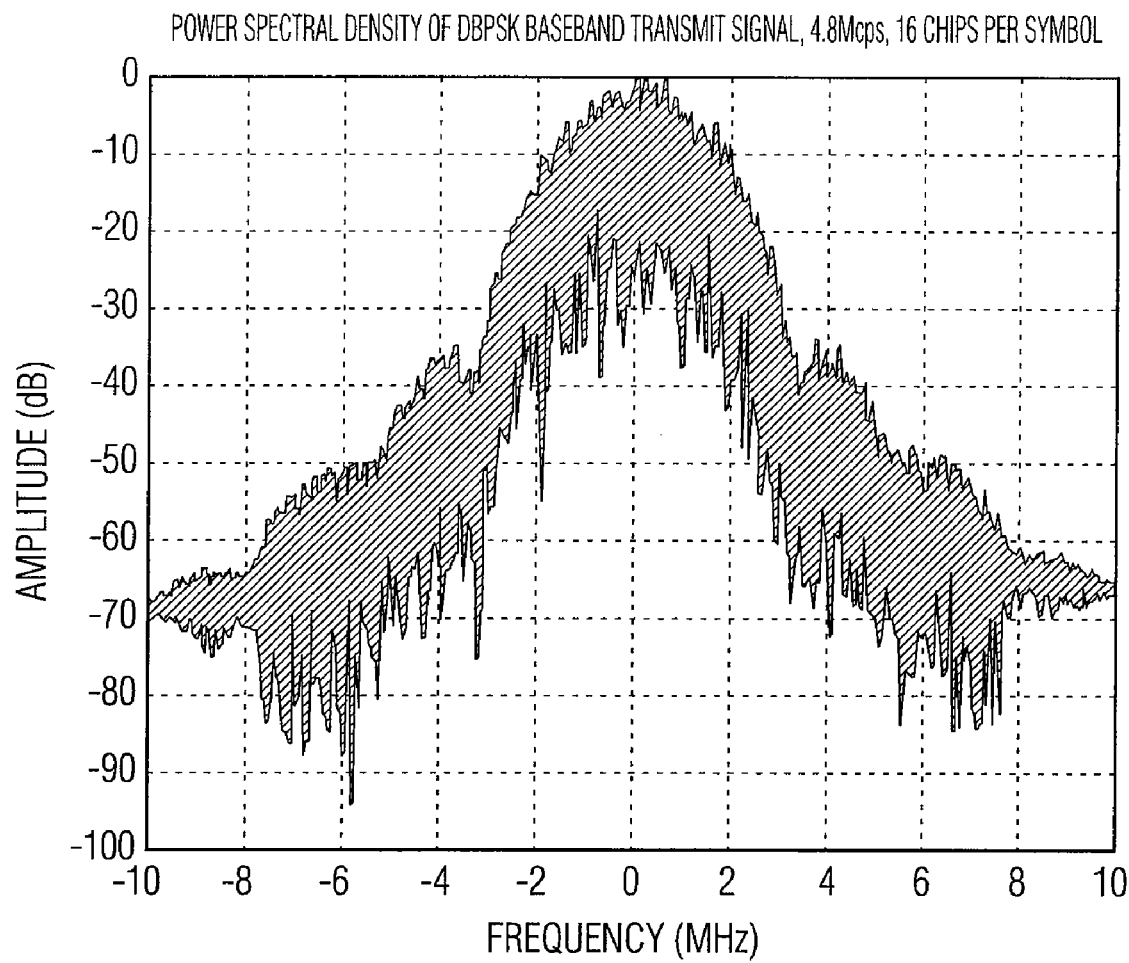
FIG. 1 shows a power spectrum for BPSK/QBL-MSK at 4.8 Mcps with 16 chips per symbol using a 12 bit DAC with nonlinear amplifications.
Figure 2:
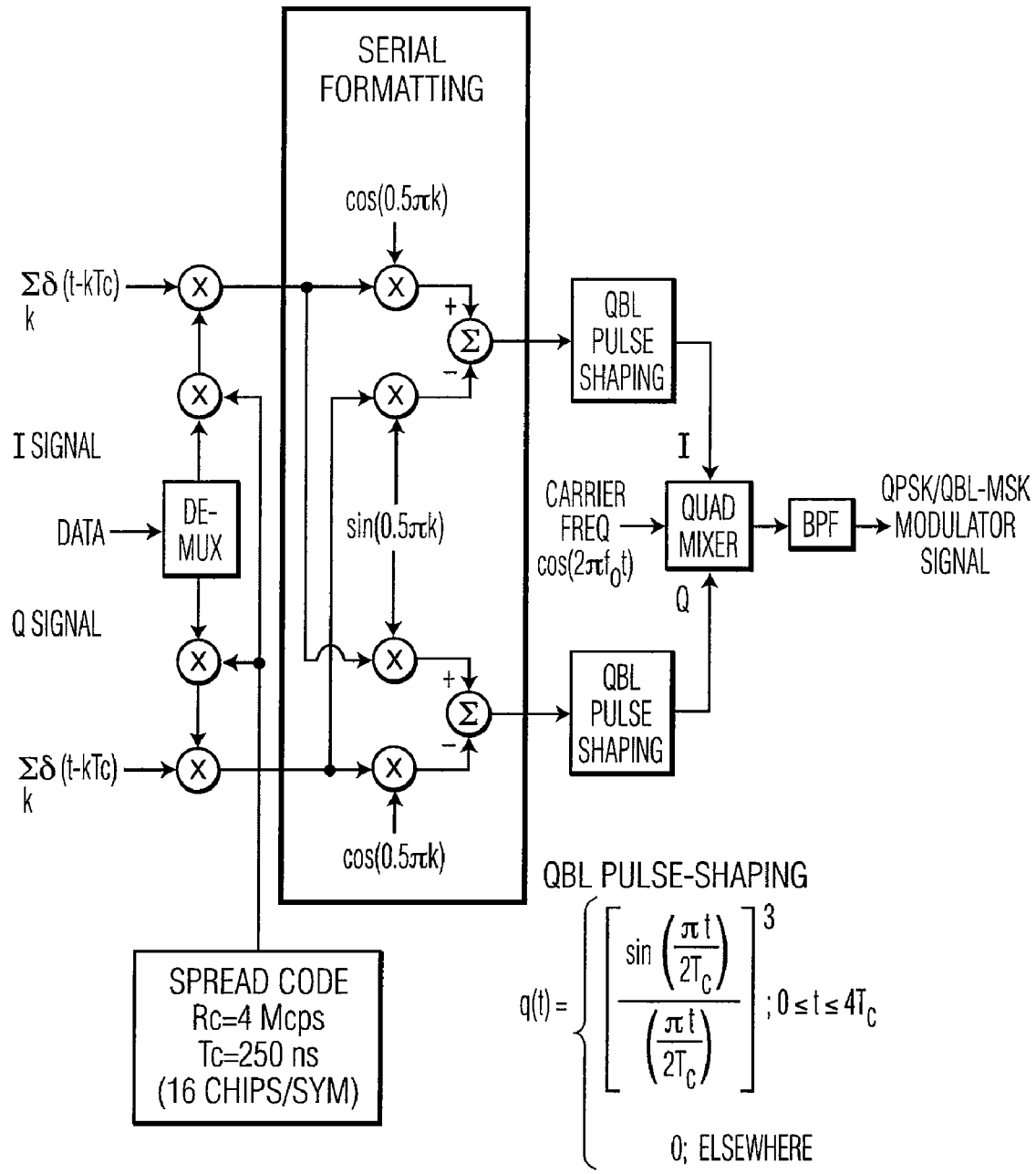
FIG. 2 shows a block diagram for a QPSK/QBL-MSK modulator.
Figure 3A:
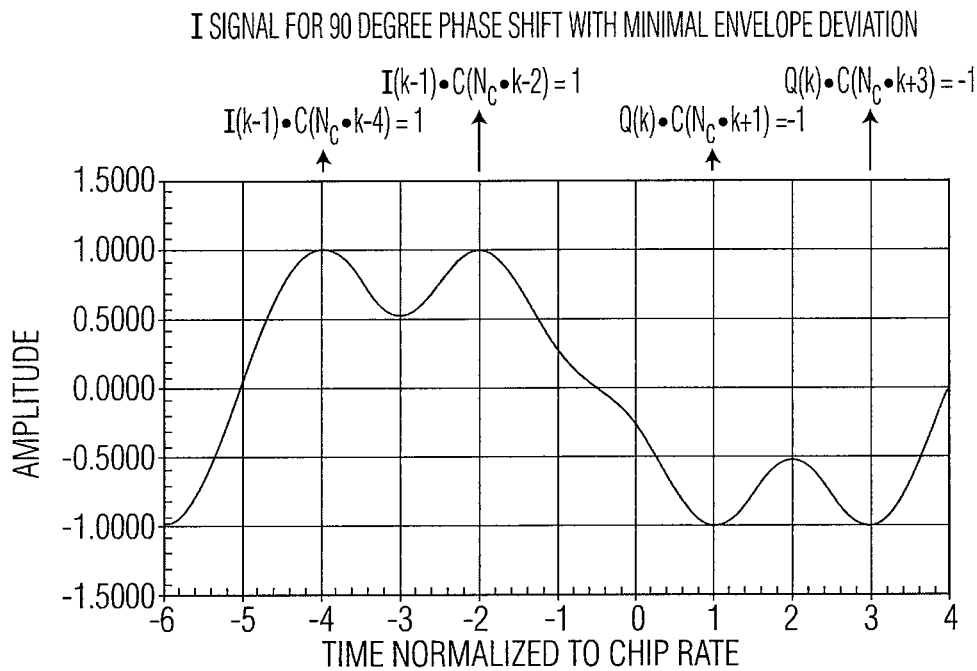
FIGS. 3A, 3B and 3C show signal conditions where the RF envelope deviation is minimal.
Figure 3B:
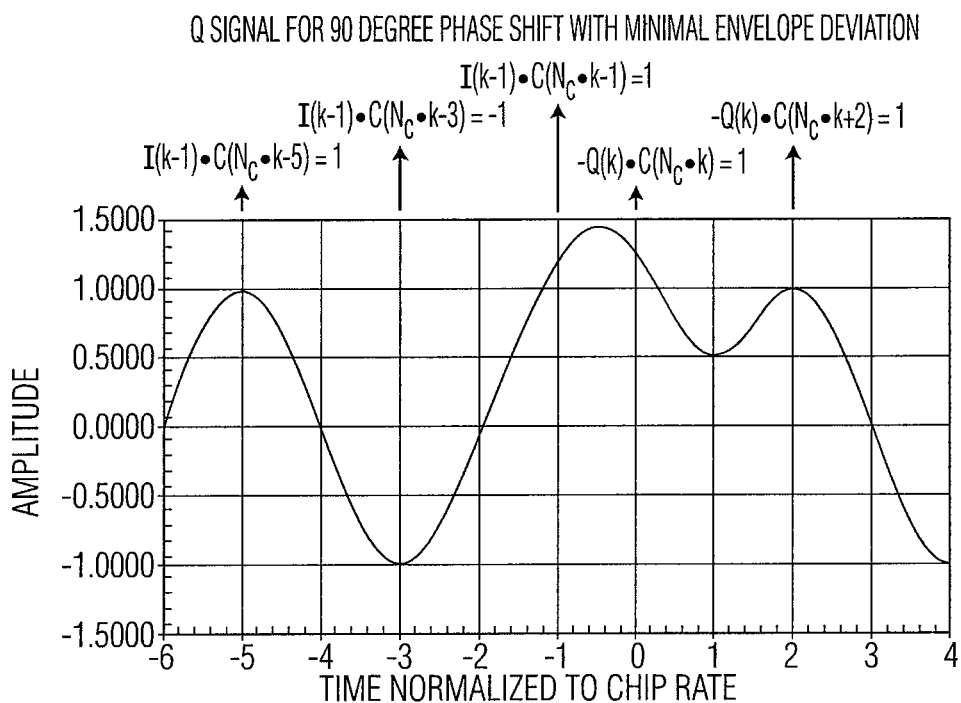
Figure 3C:
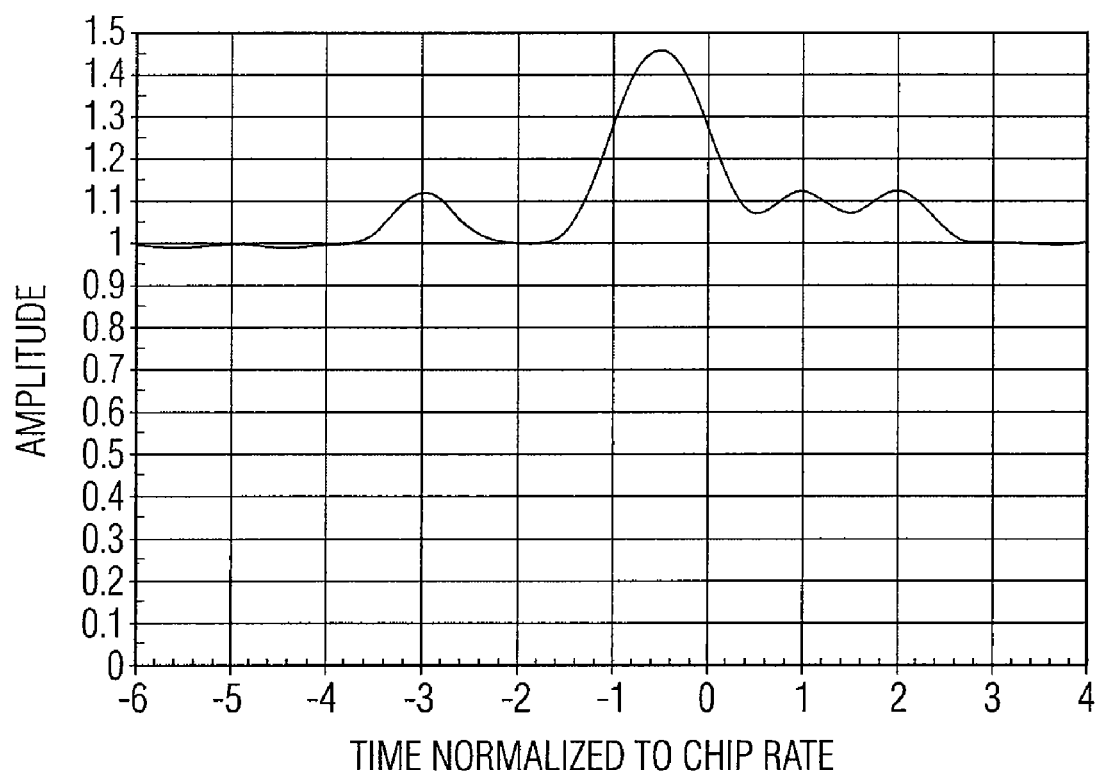
Figure 4A:
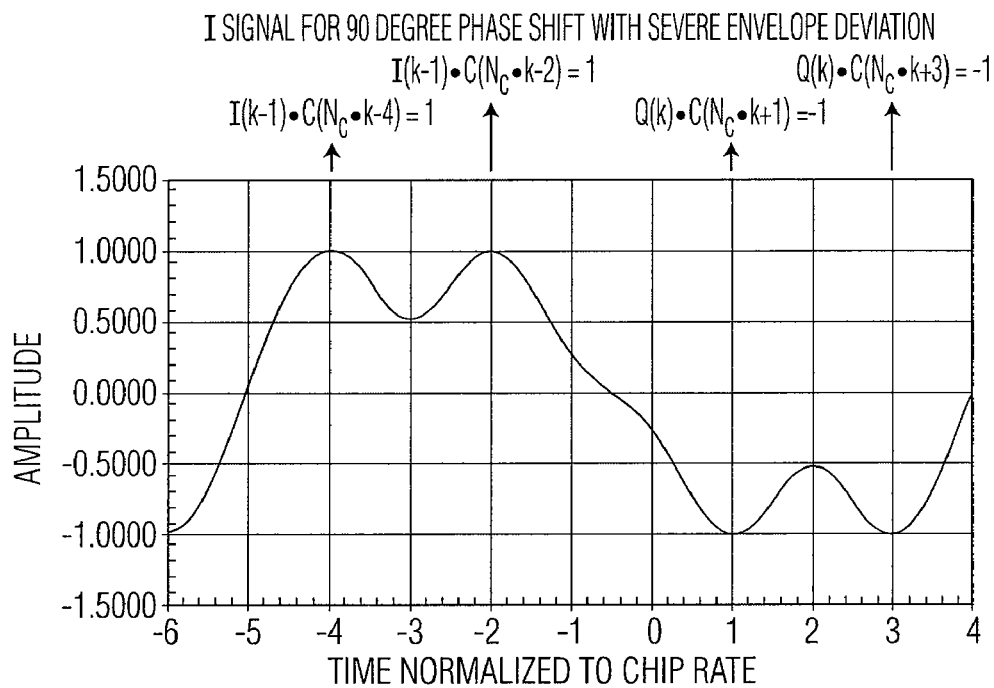
FIGS. 4A, 4B and 4C show signal conditions where the RF envelope deviation is severe.
Figure 4B:
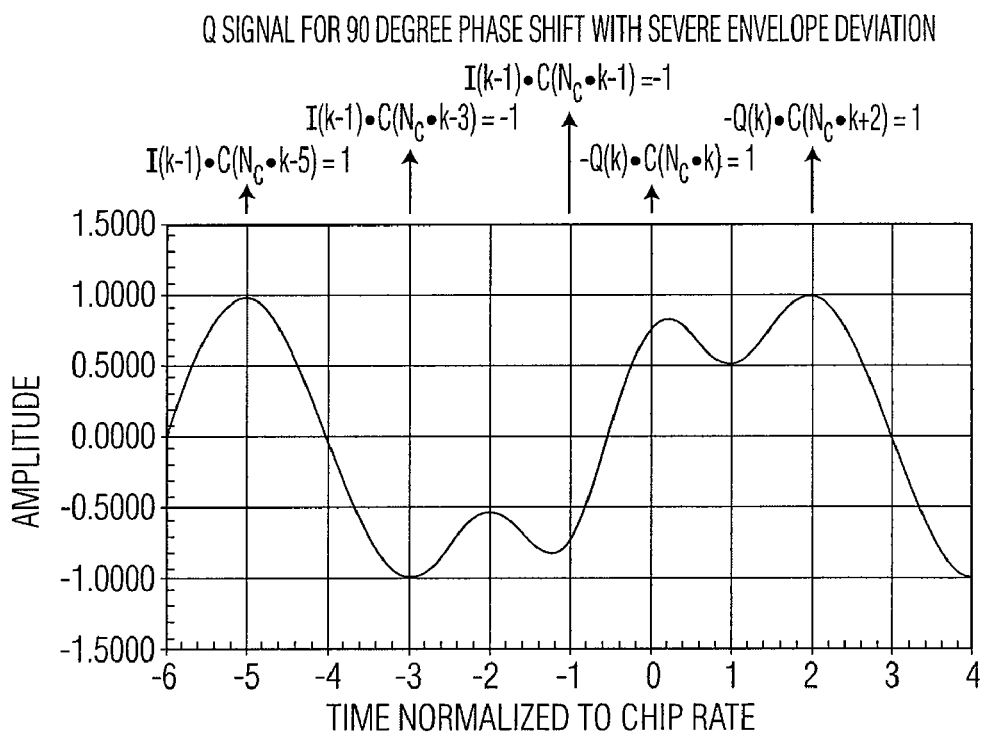
Figure 4C:
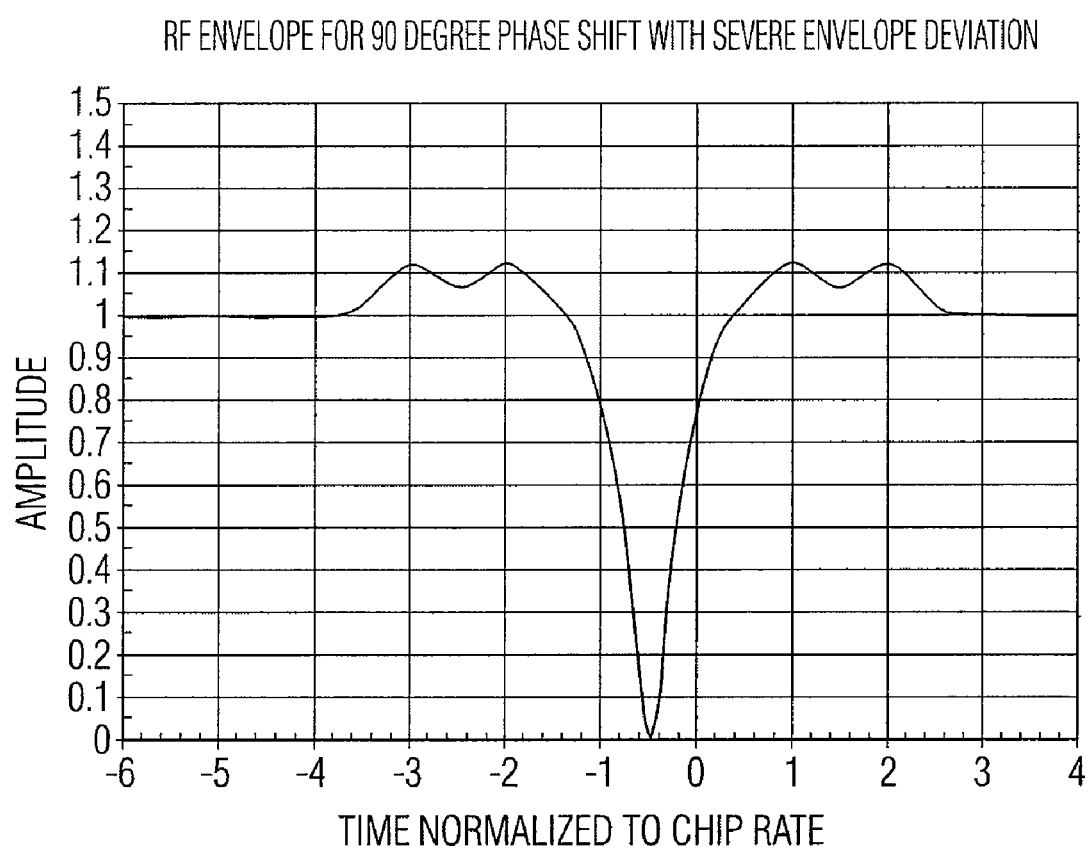

For BPSK data modulation, the SQBL-MSK spreading signal is not impacted by the data modulation. For QPSK data modulation, however, the SQBL-MSK spreading signal is impacted by the data modulation at the symbol boundary, when either a $-0.5\pi$ ($-90$ degree) or $0.5\pi$ (90 degree) phase change between symbols is being made. Two different 90 degree phase change boundaries associated with QPSK data modulation, where the past QPSK symbol is at 0 degrees and the present QPSK symbol is at 90 degrees are described below to show two significantly different RF envelope effects. Severe RF envelope distortion is seen in FIGS. 4A, 4B and 4C, when both the I and Q signals go to zero at the same point in time, resulting in the RF envelope going to zero. Minimal RF envelope deviation is shown in FIGS. 3A, 3B and 3C for the condition where the I and Q signals do not go to zero at the same point in time. The FIGS. clearly show that the near constant RF envelope performance of SQBL-MSK is not preserved. To preserve the near constant RF envelope performance of SQBL-MSK, a phase mapping process is performed by the present invention. The phase mapping process changes the phase trajectory only about the symbol boundary. Since this change occurs only at the boundary, the SQBL-MSK data modulation equation holds except at the symbol boundary.

Figure 16:
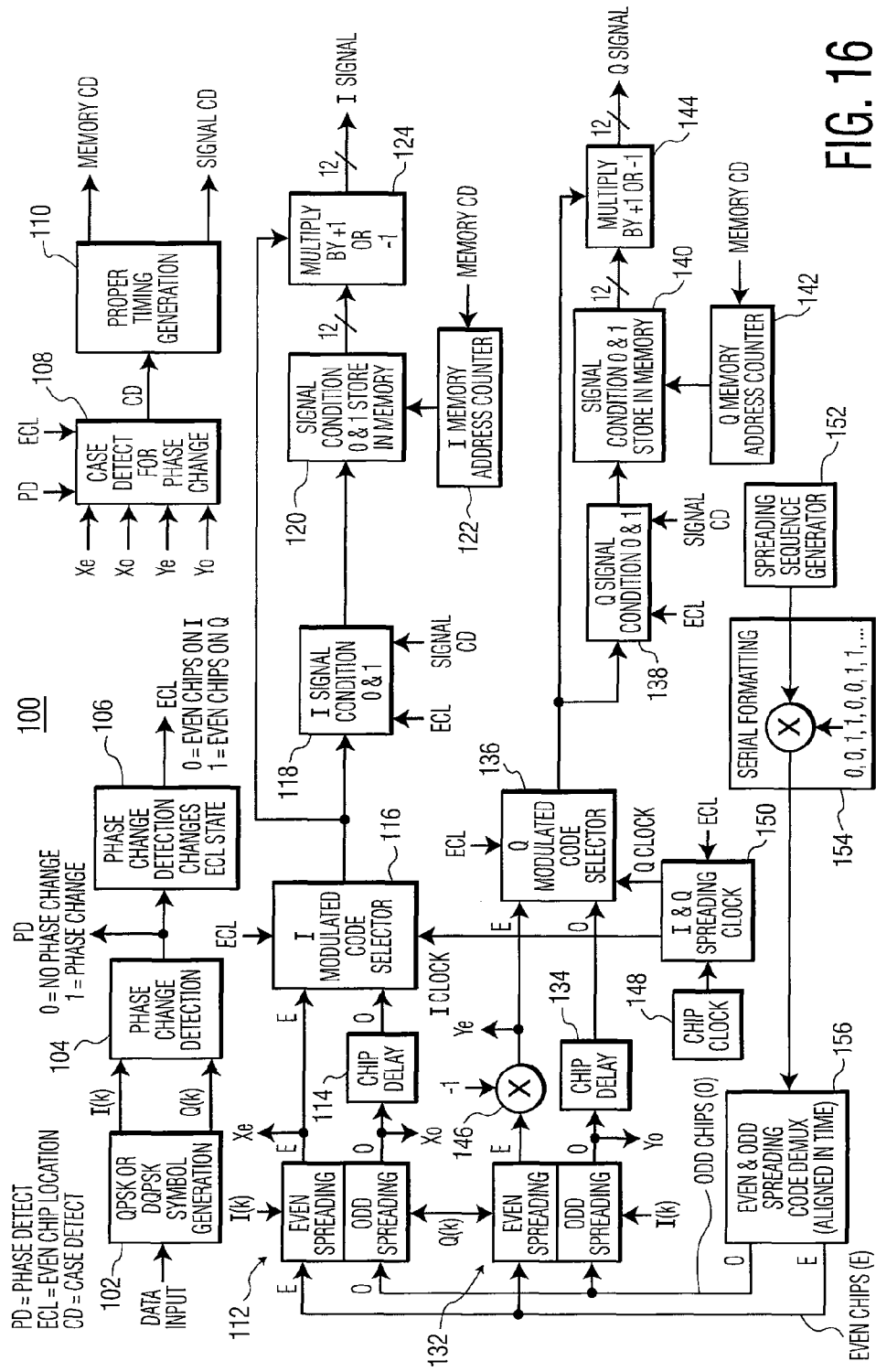
FIG. 16 shows a block diagram of a QPSK/QBL-MSK modulator implementing phase mapping, in accordance with an embodiment of the present invention.
Figure 19A:
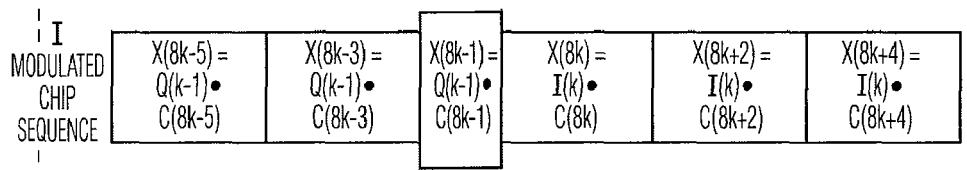
FIG. 19 shows a timing diagram of the I and Q modulated chip sequences, for a third condition, as they are mapped in the modulator of FIG. 16.
Figure 19B:
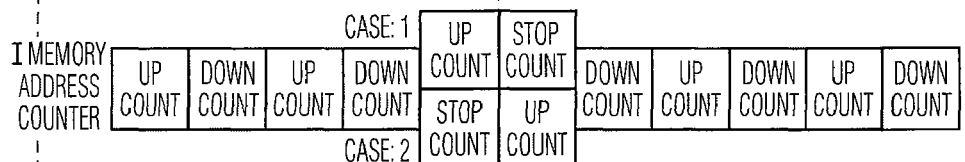
Figure 19C:
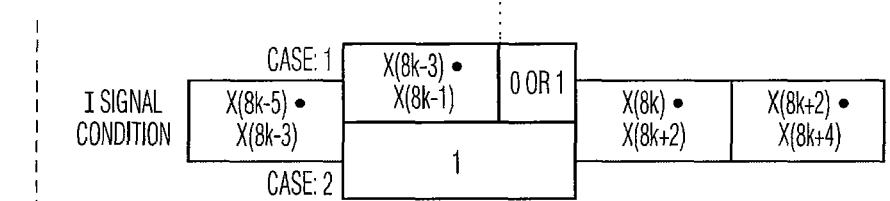
Figure 19D:
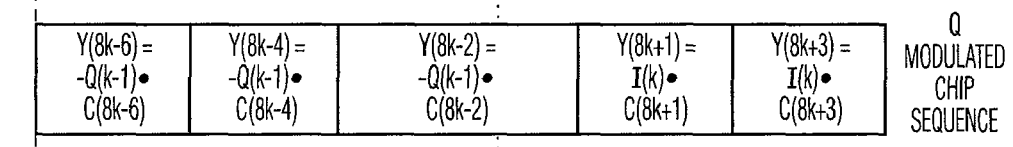
Figure 19E:
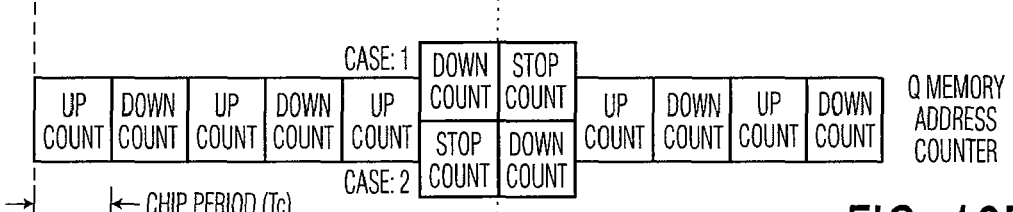
Figure 19F:
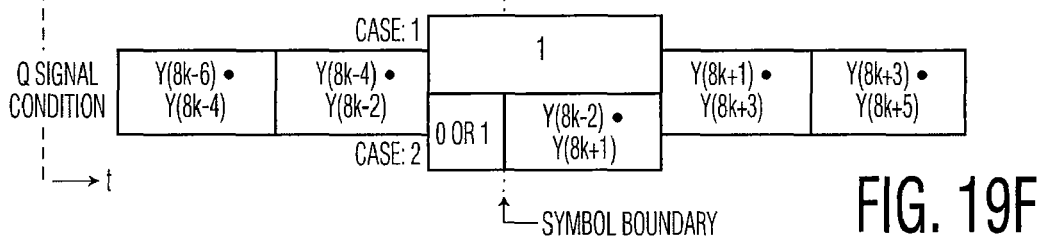
Figure 20A:
FIG. 20 is a timing diagram showing the generation of the I and Q modulated chip sequences for a −90 or 90 degree symbol phase change for one condition, as they are mapped in the modulator of FIG. 16.
Figure 20B:
Figure 20C:
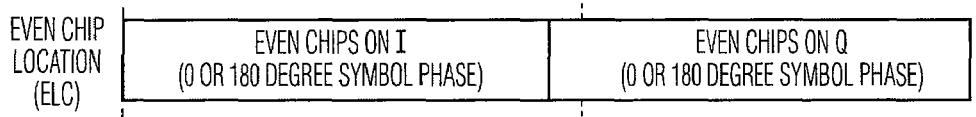
Figure 20D:
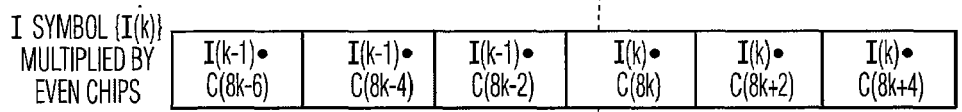
Figure 20E:
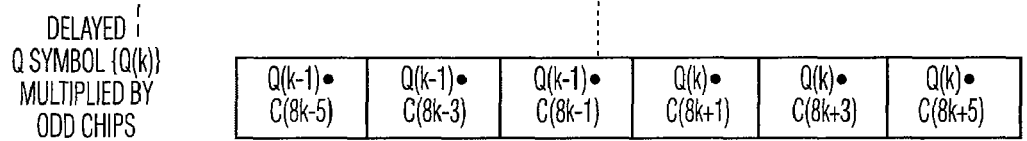
Figure 20F:
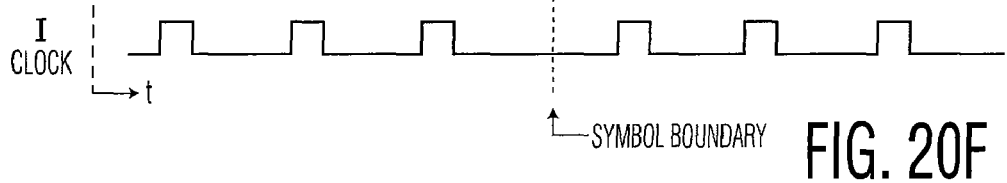
Figure 20G:
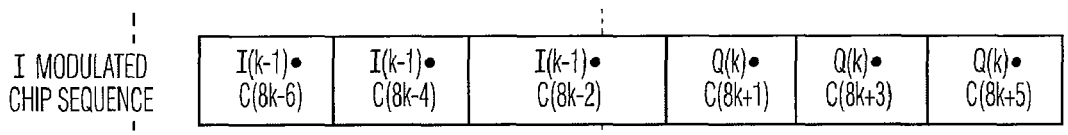
Figure 20H:
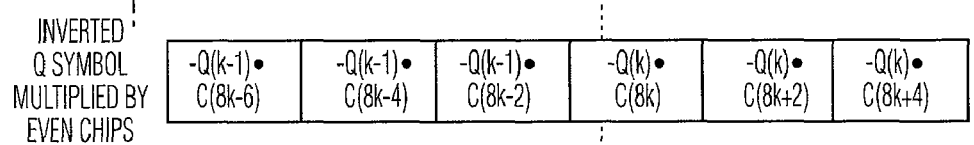
Figure 20I:
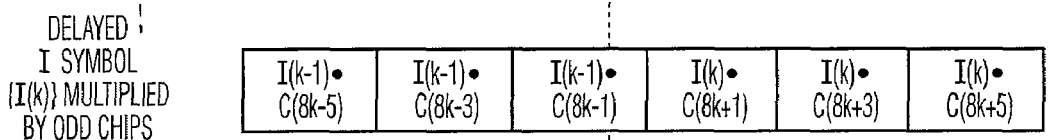
Figure 20J:
Figure 20K:
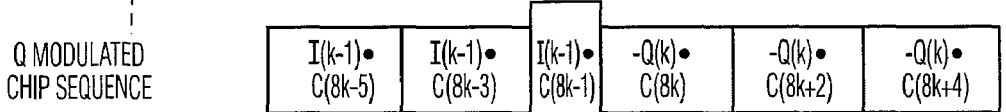
Figure 20L:
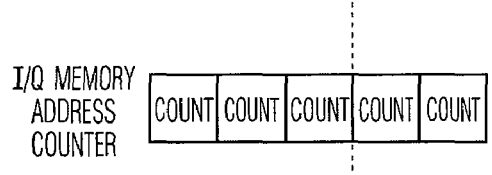
Figure 21G:
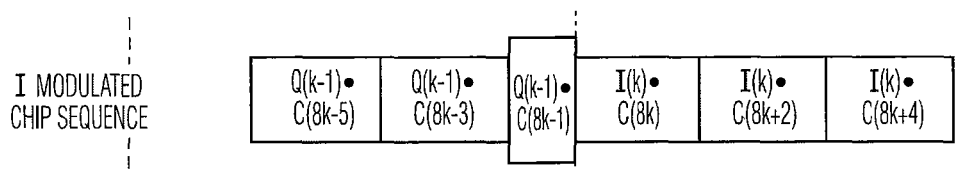
FIG. 21 is a timing diagram showing the generation of the I and Q modulated chip sequences for a −90 or 90 degree symbol phase change for a second condition, as they are mapped in the modulator of FIG. 16.
Figure 21H:
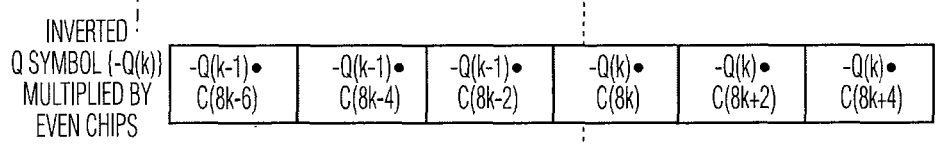
Figure 21I:
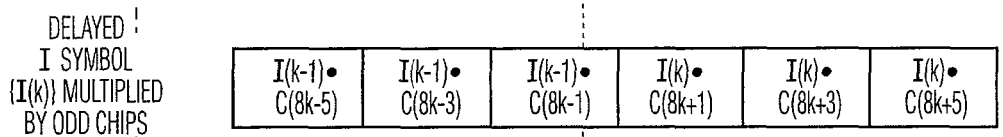
Figure 21J:
Figure 21K:
Figure 21L:
Figure 22A:
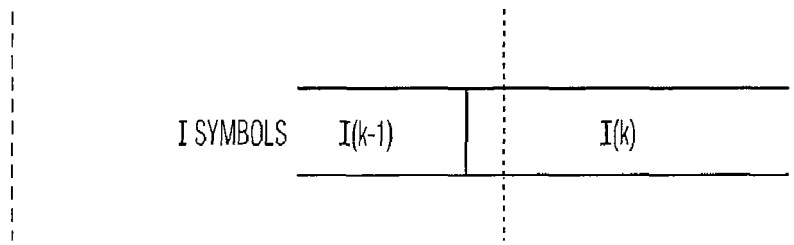
FIG. 22 is a timing diagram showing how the phase change detection (PD) signal along with the even chip location (ECL) signal are used to generate the case detection (CD) signal, as implemented in the embodiment of FIG. 16.
Figure 22B:
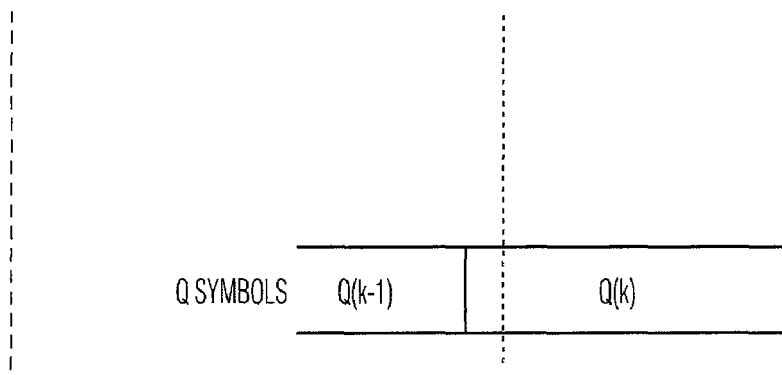
Figure 22C:
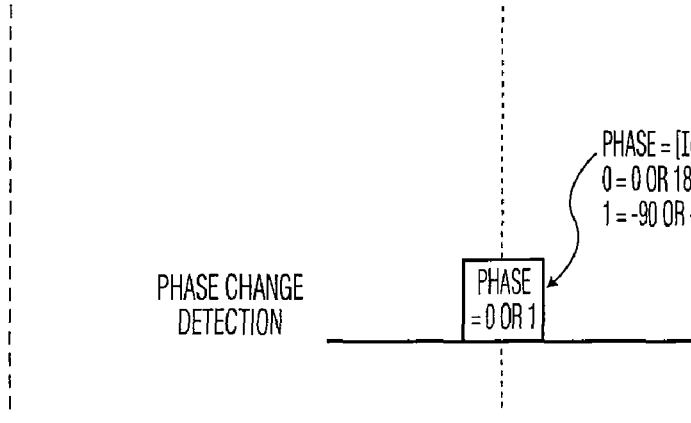
Figure 22D:
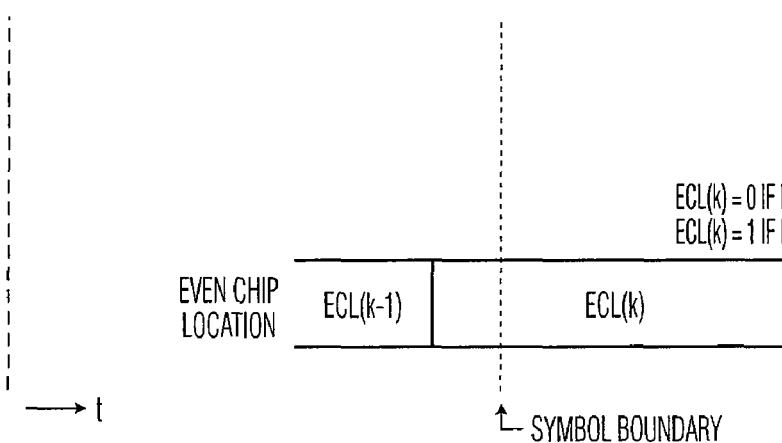
Figure 24F:
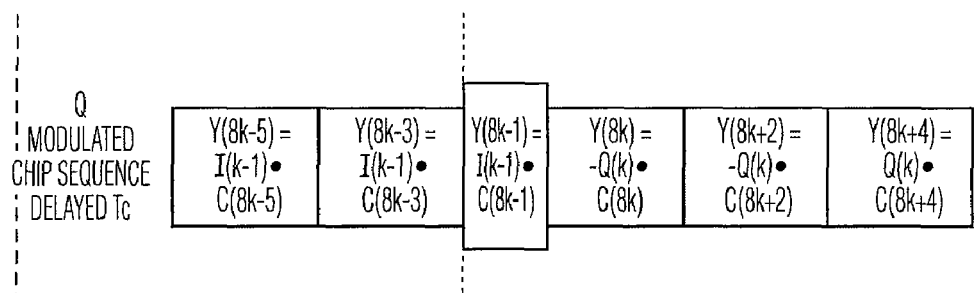
FIG. 24 is a timing diagram showing generation of delayed and advanced I and Q signals with applied multiplication, as implemented in the embodiment of FIG. 16.
Figure 24G:
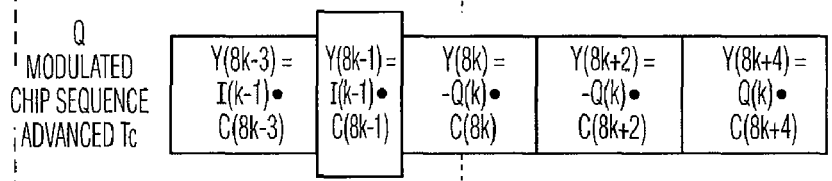
Figure 24H:
Figure 24I:
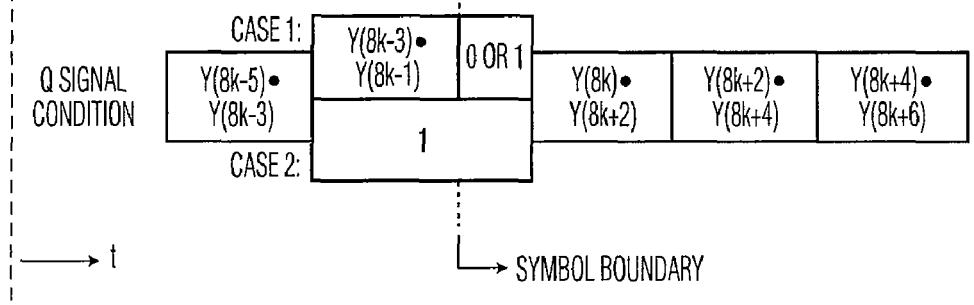

FIG. 16 shows a block diagram of an embodiment of the SQBL-MSK modulator, designated as 100, with I $\{x(t)\}$ and Q $\{y(t)\}$ data modulation of BPSK or QPSK with SQBL-MSK spreading on the data symbols. Modulator 100 is described below by reference to FIGS. 12-15 (states 1-4) and timing diagrams of FIGS. 17-24. The equations for the I$\{x(t)\}$ and Q $\{y(t)\}$ signals modulating the carrier, when obtained from equation 1 are as follows:

$$x(t) = \sum_{k=0}^{N} \left\{ \left[ \sum_{i=0}^{M-1} (-1)^i c_{2i+2kM} \cdot p(t - [2i + 2kM]T_c) \right] \cos(\theta_k) + \right. \quad \text{(eqn 4)}$$
$$\left. \left[ \sum_{i=0}^{M-1} (-1)^i c_{2i+2kM+1} \cdot p(t - [2i + 2kM + 1]T_c) \right] \sin(\theta_k) \right\}$$

and $$y(t) = \sum_{k=0}^{N} \left\{ -\left[ \sum_{i=0}^{M-1} (-1)^i c_{2i+2kM} \cdot p(t - [2i + 2kM]T_c) \right] \sin(\theta_k) + \right. \quad \text{(eqn 5)}$$
$$\left. \left[ \sum_{i=0}^{M-1} (-1)^i c_{2i+2kM+1} \cdot p(t - 2kM + 1)T_c \right] \cos(\theta_k) \right\}.$$

Since the data symbol phase for QPSK or DQPSK is equal to $-90, 0, 90,$ or 180 degrees, over each symbol period, either the even spreading sequence chips are on I with the odd chips on Q (0 and 180 degree symbol conditions) or the odd spreading sequence chips are on I with the even chips on Q ($-90$ and 90 degree symbol conditions). For a past symbol at 0 or 180 degrees with a $-90$ or 90 degree phase change, the even chips are on the I signal and the odd chips are on the Q signal for the past symbol, and the odd chips are on the I signal and the even chips are on the Q signal for the present symbol. For this phase condition and change, the switch from the odd to even chips on the Q signal is the key concern, since the Q signal has two chip pulses at the symbol boundary separated by only 1 chip period, where typically they are separated by 2 chip periods (see FIG. 12B).

For a past symbol at $-90$ or 90 degrees with a $-90$ or 90 degree phase change, the odd chips are on the I signal and the even chips are on the Q signal for the past symbol, and the even chips are on the I signal and the odd chips are on the Q signal for the present symbol. For this phase condition and change, the switch from the even to odd chips on the I signal is the key concern, since the I signal has two chip pulses at the symbol boundary separated by only 1 chip period (see FIG. 14A). By examining the two different chip boundary conditions for these two past symbol and phase change conditions, a phase mapping that significantly reduces the RF envelope deviation is implemented by the present invention. This phase mapping minimizes the processing gain reduction to 1 chip for the condition when a chip pulse needs to be deleted to prevent a severe RF envelope condition.

Figure 12A:
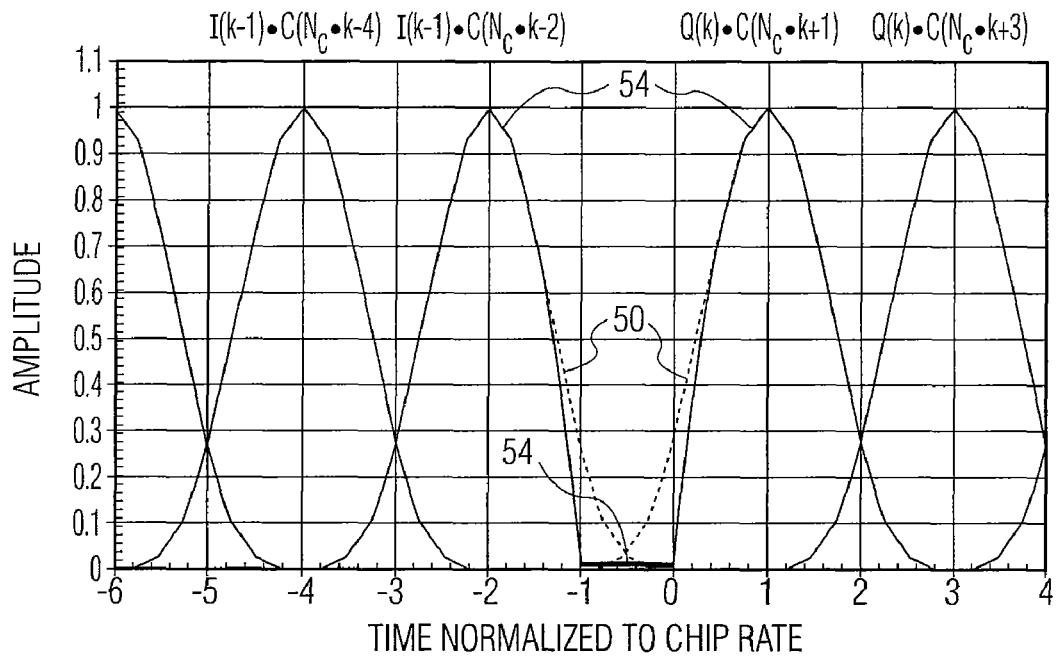
FIGS. 12A and 12B show modulated chip pulse shaped sequences about the symbol boundary for a first state, as they are mapped using an embodiment of the present invention.
Figure 12B:
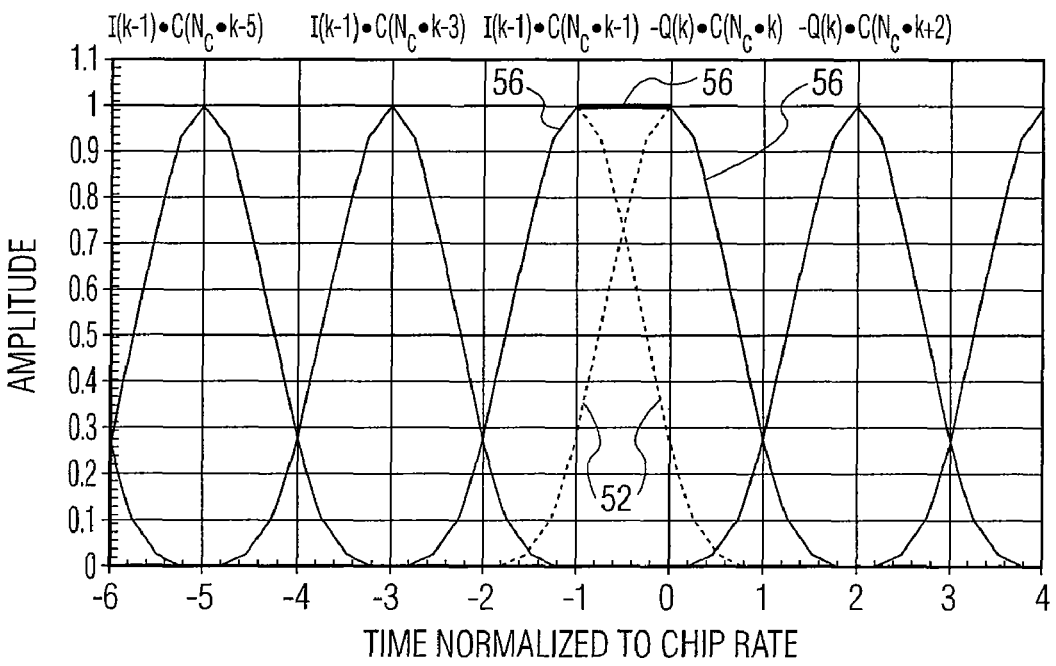

Four states will now be described by reference to FIGS. 12-15. State 1 (FIGS. 12A and 12B) exists when the past symbol is at 0 or 180 degrees with a $-90$ or 90 degree phase change and the adjacent modulation chip pulses at the symbol boundary are equal. The modulated chip pulsed sequences about the symbol boundary for state 1 are shown in FIGS. 12A and 12B for a 4 sample per chip digital implementation of the waveform. Since state 1 corresponds to $I(k-1)\cdot C(N_C\cdot k-1)=-Q(k)\cdot C(N_C\cdot k)$, the severe RF envelope deviation is prevented. It will be understood that C(k) is the serial formatted chip, which is the chip value $c_k$ times the $-1^k$ serial formatting. The dotted line modulated pulse shapes 50 and 52 at the symbol boundary are the standard chip pulses that would be implemented. Instead of implementing these standard chip pulses, the dark highlighted chip pulses 54 and 56 are implemented by the present invention.

Accordingly, for the I signal, the standard two unique signal mapping is used up to $-2$ chips from the symbol boundary (at 0) and 1 chip after the symbol boundary. Between $-2T_C$ to $-T_C$ and also between 0 to Tc, the I signal is implemented by using the unique signal mapping for a change between two adjacent modulated chips (refer to the curves in FIG. 8). Since this condition goes to zero at time $-T_C$ and 0, the I signal between $-T_C$ and 0 is set to zero, as shown in FIG. 9A. The highlighted pulse shaping 54 for the I signal, shown in FIG. 12A, is the modified I signal structure implemented by the present invention.

For the Q signal, the standard two unique signal mapping is used up to $-2$ chips from the symbol boundary (at 0) and 1 chip after the symbol boundary. To simplify the mapping between $-2T_C$ to $-T_C$ and also 0 to $T^C$, dotted chip pulses 52 are not included in the Q signal. This allows the Q signal between $-2T_C$ to $-T_C$ and also between 0 to $T_C$ to be implemented with the standard unique signal mapping (refer to the curves shown in FIG. 8). For state 1 where $I(k-1)\cdot C(N_C\cdot k-1)=-Q(k)\cdot C(N_C\cdot k)$, the Q signal is equal to either $+1$ or $-1$ at both times $-T_C$ and 0. Since the Q signal condition goes to either a value of $+1$ or $-1$ at times $-T_C$ and 0, the Q signal between $-T_C$ and 0 is set equal to the appropriate $+1$ or $-1$ peak signal level. The highlighted pulse shaping 56 for the Q signal shown in FIG. 12B, is the modified Q signal structure implemented by the present invention. Since this new waveform mapping is based on the standard two signal conditions combined with a fixed level of $+1, -1,$ or 0, which is already in the look-up table, its implementation by the present invention is significantly reduced.

Figure 13A:
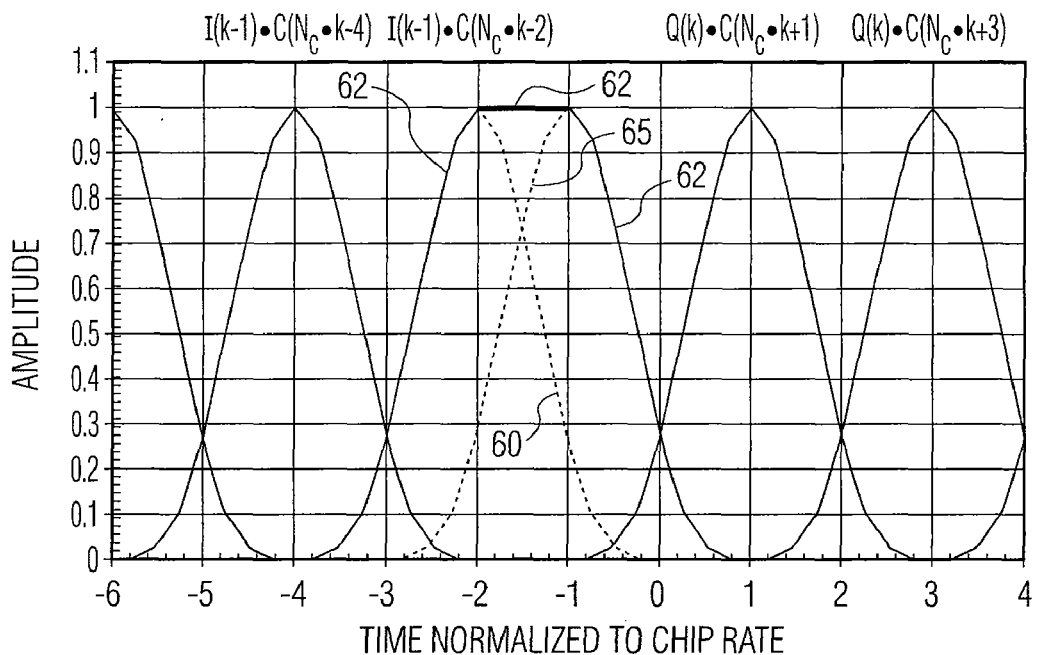
FIGS. 13A and 13B show modulated chip pulse shaped sequences about the symbol boundary for a second state, as they are mapped using an embodiment of the present invention.
Figure 13B:
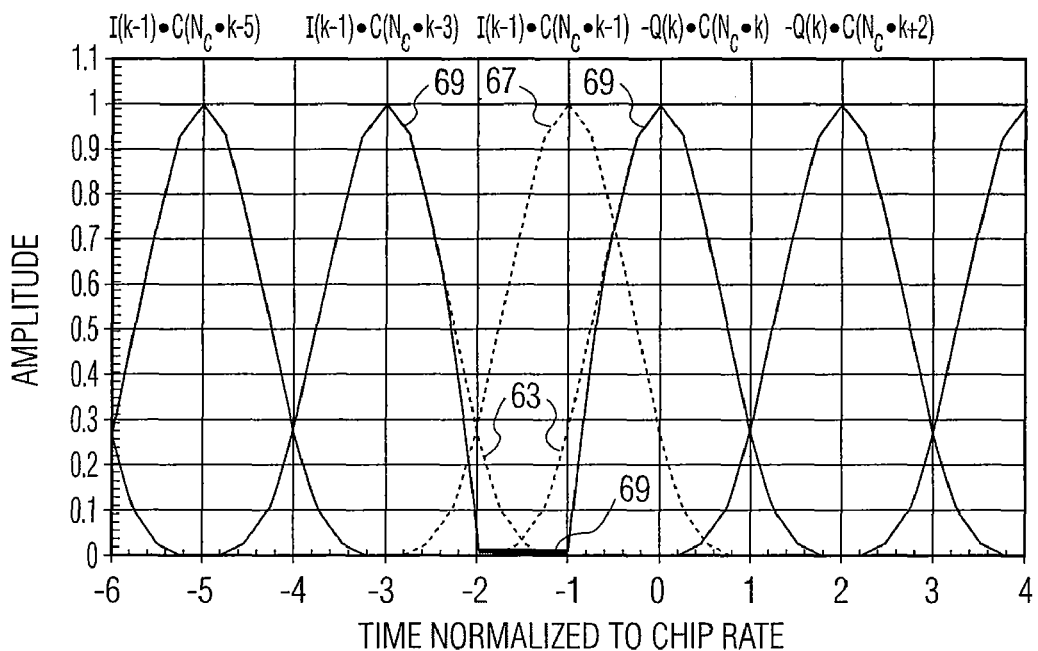

State 2 (FIGS. 13A and 13B) exists when the past symbol is at 0 or 180 degrees with a −90 or 90 degree phase change and the adjacent modulation chip pulses at the symbol boundary are opposite to each other. The modulated chip pulsed sequences about the symbol boundary for state 2 are shown in FIGS. 13A and 13B for a 4 sample per chip digital implementation of the waveform. Since state 2 corresponds to $I(k-1)\cdot C(N_C\cdot k-1)=Q(k)\cdot C(N_C\cdot k)$, the severe RF envelope deviation condition exists. The dotted line modulated pulse shapes 60, 63, 65 and 67 at the symbol boundary are the standard chip pulses that would be implemented, except for the I signal where a chip pulse 65 is inserted at $-T_C$. The inserted chip pulse is multiplied by $I(k-1)\cdot C(N_C\cdot k-2)$, so that a constant +1 or −1 signal level is maintained from time $-2T_C$ to $-T_C$. Instead of implementing these standard chip pulses, the dark highlighted chip pulses 62 and 69 are implemented.

For the I signal, the standard two unique signal mapping is used up to −3 chips from the symbol boundary (at 0) and after the symbol boundary. To simplify the mapping between $-3T_C$ to $-2T_C$ and also $-T_C$ to 0, the dotted chip pulses are not included in the I signal. This allows the I signal between $-3T_C$ to $-2T_C$ and also between $-T_C$ to 0 to be implemented with the standard unique signal mapping (refer to curves 35 and 30 shown in FIG. 8). Since inserted chip pulse 65 is equal to the overlapping chip pulse, $\{I(k-1)\cdot C(N_C\cdot k-2)\}$, the I signal is equal to either +1 or −1 at time $-2T_C$ and $-T_C$. Since the I signal condition goes to either a value of +1 or −1 at time $-2T_C$ and $-T_C$, the I signal between $-2T_C$ and $-T_C$ is set equal to the appropriate +1 or −1 peak signal level. The highlighted pulse shaping 62 for I signal depicted in FIG. 13A, is the modified I signal structure implemented by the present invention.

For the Q signal, the standard two unique signal mapping is used up to −3 chips from the symbol boundary (at 0) and 1 chip after the symbol boundary. Unlike the chip insertion with the I signal, the Q chip pulse 67 centered at $-T_C$ is deleted from the Q data modulation chip pulse sequence. The dotted line modulated pulse shapes at the symbol boundary are the standard chip pulses that would be implemented, except for the Q signal, where chip pulse 67 is deleted at $-T_C$. Between $-3T_C$ to $-2T_C$ and also between $-T_C$ to 0, the Q signal is implemented by using the unique signal mapping for a change between two adjacent modulated chips (refer to the curves in FIG. 8). Since this condition goes to zero at time $-2T_C$ and $-T_C$, the Q signal between $-2T_C$ and $-T_C$ is set to zero, as shown in FIG. 13B. The highlighted pulse shaping 69 for the Q signal depicted in FIG. 13B is the modified Q signal structure implemented by the present invention. Since this new waveform mapping is based on the standard two signal condition combined with a fixed level of +1, −1, or 0, its implementation in a look-up table is reduced.

State 3 (FIGS. 14A and 14B) exists when the past symbol is at −90 or 90 degrees with a −90 or 90 degree phase change and the adjacent I modulation chip pulses at the symbol boundary are equal. The modulated chip pulsed sequences about the symbol boundary for state 3 are shown in FIGS. 14A and 14B for a 4 sample per chip digital implementation of the waveform. Since state 3 corresponds to $Q(k-1)\cdot C(N_C\cdot k-1)=I(k)\cdot C(N_C\cdot k)$, the severe RF envelope deviation is prevented. The dotted line modulated pulse shapes 70 and 72 at the boundary are the standard chip pulses that would be implemented. Instead of implementing these standard chip pulses, the dark highlighted chip pulse shapes 74 and 76 are implemented by the present invention.

Comparing state 3 with state 1, it is easily seen that the I signal for state 3 is the same as the Q signal for state 1, except for the data modulation term, which is $Q(k-1)$ and $I(k)$ for state 3 versus $I(k-1)$ and $-Q(k)$ for state 1. The same similarity applies between the Q signal for state 3 and the I signal for state 1. Thus, the same phase mapping approach used for state 1 is applied to state 3 with the appropriate data modulation and chip pulse-shaping sequences on the I and Q sides.

State 4 (FIGS. 15A and 15B) exists when the past symbol is at −90 or 90 degrees with a −90 or 90 degree phase change and the adjacent I modulation chip pulses at the symbol boundary are opposite. The modulated chip pulsed sequences about the symbol boundary for state 4 are depicted in FIGS. 15A and 15B for a 4 sample per chip digital implementation of the waveform. Since state 4 corresponds to $Q(k-1)\cdot C(N_C\cdot k-1)=-I(k)\cdot C(N_C\cdot k)$, the severe RF envelope deviation condition exists. The dotted line modulated pulse shapes 80 and 83 at the boundary are the standard chip pulses that would be implemented, except for the Q signal where chip pulse 84 is inserted at $-T_C$. The inserted chip pulse is multiplied by $-Q(k-1)\cdot C(N_C\cdot k-2)$, so that a constant +1 or −1 signal level is maintained from time $-2T_C$ to $-T_C$. Instead of implementing these standard chip pulses, the dark highlighted chip pulse shapes 86 and 88 are implemented. Comparing state 4 with state 2, it is easily seen that the I signal for state 4 is the same as the Q signal for state 2, except for the data modulation term, which is $-Q(k-1)$ and $I(k)$ for state 4 versus $I(k-1)$ and $Q(k)$ for state 2. The same similarity applies between the Q signal for state 4 and the I signal for state 2. Thus, the same phase mapping approach used for state 4 may be applied to state 2 with the appropriate data modulation and chip pulse-shaping sequences on the I and Q sides.

Returning to FIG. 16, there is shown a block diagram of an embodiment of a QPSK/QBL-MSK modulator 100 using phase mapping of the invention to prevent the RF envelope from going close to or equal to zero. The modulator, for example, uses 8 samples per chip (M=8), which is not unique to the implementation. The QPSK or DQPSK symbol generator 102 provides an I and Q symbol related to the carrier phase shifted by 45 degrees ($\theta_k+45$ degrees in equations 4 and 5) using the relationships that $I(k)=\sqrt{2}\cos(\theta_k)$ and $Q(k)=\sqrt{2}\sin(\theta_k)$ as follows:

1) $\theta_k+45=45$ degrees, analog levels: $I(k)=1$ and $Q(k)=1$, logic levels: $I(k)=0$ and $Q(k)=0$;
2) $\theta_k+45=-135$ degrees, analog levels: $I(k)=-1$ and $Q(k)=-1$, logic levels: $I(k)=1$ and $Q(k)=1$;
3) $\theta_k+45=135$ degrees, analog levels: $I(k)=-1$ and $Q(k)=1$, logic levels: $I(k)=1$ and $Q(k)=0$;
4) $\theta_k+45=-45$ degrees: analog levels: $I(k)=1$ and $Q(k)=-1$, logic levels: $I(k)=0$ and $Q(k)=1$.

The inphase $\{I(k)\}$ and quadrature $\{Q(k)\}$ symbols are applied to the $\cos(\theta_k)$ and $\sin(\theta_k)$ symbol modulation terms ($\theta_k$ given in equations 4 and 5) by applying a −45 degree shift as follows:

1) $\theta_k=0$ degrees: analog levels: $\cos(\theta_k)=1$ and $\sin(\theta_k)=0$, logic levels: $\cos(\theta_k)=0=I(k)$ and $\sin(\theta_k)=$not needed;
2) $\theta_k=180$ degrees: analog levels: $\cos(\theta_k)=-1$ and $\sin(\theta_k)=0$, logic levels: $\cos(\theta_k)=1=I(k)$ and $\sin(\theta_k)=$not needed;
3) $\theta_k=90$: analog levels: $\cos(\theta_k)=0$ and $\sin(\theta_k)=1$, logic levels: $\sin(\theta_k)=0=Q(k)$ and $\cos(\theta_k)=$not needed;
4) $\theta_k=-90$: analog levels: $\cos(\theta_k)=0$ and $\sin(\theta_k)=-1$, logic levels: $\sin(\theta_k)=1=Q(k)$ and $\cos(\theta_k)=$not needed.

These four phase state are reduced to two basic conditions:
1) $\theta_k=0$ or 180: analog levels: $\cos(\theta_k)=I(k)$ and $\sin(\theta_k)=0$, logic levels: $\cos(\theta_k)=I(k)$ and $\sin(\theta_k)=$not needed;
2) $\theta_k=-90$ or 90: analog levels: $\sin(\theta_k)=Q(k)$ and $\cos(\theta_k)=0$, logic levels: $\sin(\theta_k)=Q(k)$ and $\cos(\theta_k)=$not needed.

The I(k) and Q(k) symbols out of QPSK/DQPSK symbol generator 102, as shown in FIG. 16, are the data modulation terms used to spread the even and odd spreading chips according to equations 4 and 5 and the relationship established between the symbol phase and the I(k) and Q(k) symbols. The −1 multiplication on the modulated even chips performed by mixer 146 corresponds to a digital exclusive- or operation on the modulated even chips.

As shown, the spreading code is produced by spreading sequence generator 152. The spreading code is serially formatted by mixer 154 and divided into even chips (e) and odd chips (o) by code multiplexer 156. The I(k) and Q(k) symbols are separately modulated by modulators 112 and 132 into even spread and odd spread symbols. The odd spread symbols are delayed by a single chip by chip delays 114 and 134.

The chip clock 148 is divided into an I and Q spreading clock by divider 150, which is controlled by even chip control (ECL). Even and odd chips are separately selected by I modulated code selector 116 and Q modulated code selector 136.

The data modulated odd and even chips are selected by proper clocking of the modulated code selected. For 0 or 180 degree data phase change, the same data modulated spread code is maintained on the signal side. For −90 or 90 degree data phase transition, the data modulated spreading code is switched by the even chip control (ECL). The ECL control provides the proper clock timing to the I and Q modulated code selectors 116 and 136 to generate the desired I and Q modulated chip sequences. The ECL is generated from the phase change logic, designated as 106, which shifts the side (I or Q) that the even chips are located on, after recognizing that a phase change has occurred by phase change detector (PD) 104. Thus, if the even chips for the past symbol are on the I side, a phase change detection by phase change detector 104 switches the even chips onto the Q side for the present symbol. The next phase change detection switches the even chips back onto the I side. The phase change detection is obtained by digitally multiplying (exclusive or) the past I and Q symbols and the present I and Q symbols together. The equation for this operation is the following:

Phase Change Detection=
[$I(k-1) \oplus Q(k-1)] \oplus [I(k) \oplus Q(k)$]    (eqn 6)

where $\oplus$ represents the Exclusive-Or operation. If the phase change detection is 0, then no −90 or +90 degree phase change has occurred, while a −90 or +90 degree phase change results in a logic 1 at the output of detector 104. Since the I and Q symbol exclusive- or output is logic 0 for 0 or 180 degree symbol phase condition and logic 1 for the −90 or 90 degree symbol phase condition, the only way the phase change detection is equal to logic 1 is when there is a change from a 0 or 180 degree symbol phase to a −90 or 90 degree symbol phase, or there is a change from a −90 or 90 degree symbol phase to a 0 or 180 degree symbol phase. For these phase change conditions, a 0 is exclusive-ored with a 1, resulting in a phase change detection equal to 1. This results in the desired phase change detection for all sixteen possible past to present phase changes.

To understand how the rest of the process shown in FIG. 16 provides the desired I and Q signals (as shown in FIGS. 12 through 15) a simple 0 or 180 degree symbol phase change for a 0 or 180 degree past symbol phase is described. FIG. 17 shows the I and Q modulated chip sequences (a and d), memory address (b and e), and signal conditions (c and f) for this phase change. From these signals, the proper I and Q signals for this phase change condition are generated. The I and Q modulated chip sequences are the output signals of the I and Q modulated code selectors 116 and 136, respectively. These two signals are used to invert (−1) or non-invert the 2's complement memory output of respective memory 120 and memory 140, using the multiplier operation by multipliers 124 and 144 following the memories. By using this method, only two signal conditions shown in FIG. 8 from time $T_C$ to $2T_C$, need to be stored in the signal memories. By comparing the past and present I modulated chips, the I signal condition (c) is generated, as shown in FIG. 17. This signal, provided by conditioner 118, is either 0 or 1, where 0 corresponds to the two modulation chips being equal (curve 35 in FIG. 8 for time $T_C$ to $2T_C$) and 1 corresponds to the two modulation chips being opposite (curve 30 in FIG. 8 for time $T_C$ to $2T_C$). This signal points the memory, by way of address counter 122, to the correct signal condition to be read out from memory 120.

The same process is used to generate the Q signal condition (f), which provides the same 0 or 1 level corresponding to the same signal conditions determined by conditioner 138. As shown in FIG. 17, the proper up or down count on the I and Q memory results in the proper signal condition output. The signal memory output for the I side is multiplied by the I modulated chip sequence to obtain the desired I signal. Similarly, the signal memory output for the Q side is multiplied by the Q modulated chip sequence to obtain the desired Q signal. The memory address counter (122 or 142) for the signal memory on the I side and Q side operate in opposite directions. For example, when the I memory address counter is counting up, the Q memory address counter is counting down as shown in FIG. 17.

The signal memory (120 or 140) stores the two signal conditions (30 or 35 in FIG. 8). For a memory address counter operating at M times the chip rate, the signal memory is stored with the following:

$$q(n) = \begin{cases} \left[\frac{\sin\left(\frac{\pi}{2}\left[\frac{n}{M}-2\right]\right)}{\left(\frac{\pi n}{2M}\right)}\right]^3 + \left[\frac{\sin\left(\frac{\pi}{2}\left[\frac{n}{M}-2\right]\right)}{\left(\frac{\pi n}{2M}\right)}\right]^3 ; & \text{for signal condition 0} \\ -\left[\frac{\sin\left(\frac{\pi}{2}\left[\frac{n}{M}-2\right]\right)}{\left(\frac{\pi n}{2M}\right)}\right]^3 + \left[\frac{\sin\left(\frac{\pi}{2}\left[\frac{n}{M}-2\right]\right)}{\left(\frac{\pi n}{2M}\right)}\right]^3 ; & \text{for signal condition 1} \end{cases}$$

(eqn 7)

for $n = 0, 1, 2, \ldots M$.

The memory address counter (122 or 142) performs an up count by starting with 1 and counting up to M, while down counting starts at (M−1) and counts down to 0. By operating the memory address counter in this way, the maximum value of 1 and the minimum value of 0 are obtained. These two values are required when the memory address counter is stopped for a −90 or +90 degree symbol phase change.

For the other case of a simple 0 or 180 degree symbol phase change for a −90 or 90 degree past symbol phase, the I and Q modulated chip sequences, memory address, and signal conditions in FIG. 17 are interchanged with the I(k−1) I(k) data signals replaced by Q(k−1) and Q(k) for the I signal and −Q(k−1) and −Q(k) for the Q signal. This change in signal is provided by the inversion operation (mixer 146) which precedes the Q modulated code selector 136. The even chip location (ECL in FIG. 16) is used to switch the modulated chip sequences properly. This same even chip location (ECL) is used to provide the proper memory address counter direction (up or down). The even chip location is set to the I signal for the initial symbol, which corresponds to a value of 0. The first phase change detection equal to 1 changes the ECL to a value of 1, corresponding to the even chips on the Q signal. The ECL is switched back to 0 by the next phase change detection of 1. Each phase change detection value of 1 changes the value of the ECL to the other value, namely 0 to 1 or 1 to 0.

The −90 or 90 degree symbol phase change signals are generated using these same concepts and introducing the detection of two different cases near the symbol boundary to properly control the I and Q memory address counters and signal condition. FIG. 18 shows the I and Q modulated chip sequences (a and d), memory address (b and e), and signal conditions (c and f) for a −90 or 90 degree symbol phase change from a 0 or 180 degree past symbol phase.

FIG. 19 shows the I and Q modulated chip sequences (a and d), memory address (b and e), and signal conditions (c and f) for a −90 or 90 degree symbol phase change from a −90 or 90 degree past symbol phase. From FIGS. 18 and 19, case 1 and case 2 conditions need to be determined to provide the required I and Q memory address counter actions and the required I and Q signal conditions. In both figures, the two cases for the memory address counters are controlled for the chip period before and after the symbol boundary. For case 1, the memory address counter continues in its normal sequence in the chip period before the symbol boundary, but is stopped in the chip period after the symbol boundary and continues in its normal sequence in the next chip period after the symbol boundary. For case 2, the memory address counter is stopped in the chip period before the symbol boundary and continues in its normal sequence, starting in the chip period after the symbol boundary.

The control of the I and Q signal conditions are more complicated. For the even chips on the I signal for the past symbol (0 or 180 degree past symbol phase), the Q signal condition changes a chip period before the I signal condition (FIG. 18). I and Q signal conditions during a change are dependent on case 1 or case 2. For the even chips on the Q signal for the past symbol (−90 or 90 degree past symbol phase), the I signal condition changes a chip period before the Q signal condition (FIG. 19). I and Q signal conditions during a change are dependent on case 1 or case 2.

Generation of the I and Q modulated chip sequences for a −90 or 90 degree symbol phase change for either past symbol phase condition is achieved by proper selection of either the Even or Odd clock in constructing the I and Q clocks. The even chip location (ECL) signal provides the spreading clock control signal used to select the proper Even or Odd clock by clock selector 150 (FIG. 16) for the I and Q clocks. FIG. 20 shows the generation of the I and Q modulated chip sequences (g and k) for a −90 or 90 degree symbol phase change for condition 1, which corresponds to a 0 or 180 degree past symbol phase state. The desired I and Q modulated chip sequences, shown in FIG. 18, are generated as shown in FIG. 20.

FIG. 21 shows the generation of the I and Q modulated chip sequences (g and k) for a −90 or 90 degree symbol phase change for condition 2, which corresponds to a −90 or 90 degree past symbol phase state. The desired I and Q modulated chip sequences, shown in FIG. 19, are generated as shown in FIG. 21. The symbol boundary is shown to demonstrate the timing relationship between the signals in FIG. 18 through FIG. 21.

The −90 or 90 degree symbol change requires the detection of the signal state of case 1 and case 2, as shown in FIG. 18 and FIG. 19, for proper control of the I and Q memory address counters and I and Q signal conditions. FIG. 22 shows how the phase change signal (c) along with the even chip location (ECL) signal (d) are used to generate the case detection (CD) signal (i). For a phase change between symbol k-1 and symbol k, the phase change is equal to 1. For a phase change equal to 1, the ECL(k) signal state (0 or 1), which is the inverted value of ECL(k−1), is used to determine what signals are examined for the case detection (CD) signal. For ECL(k−1) equal to 0, the two cases are based on I(k−1) C(8·k−1)=−Q(k)·C(8·k). If this condition is true, then case 1 is detected. If this condition is false, then case 2 is detected. For ECL(k−1) equal to 1, the two cases are based on Q(k−1) C(8·k−1)=I(k)·C(8·k). If this condition is true, then case 1 is detected. If this condition is false, then case 2 is detected. The case detection (CD) signal timing (i) with respect to the symbol boundary is shown in FIG. 22. Since the control of the memory address counter and I and Q signal conditions needs to occur earlier than the detection point of the CD signal, timing delays (110) are imbedded in modulator 100 shown in FIG. 16 to provide the proper timing alignment.

FIG. 23 shows the timing difference for the case detection (a), memory case detection (b), and signal case detection (d) with respect to the symbol boundary shown in FIG. 17 through FIG. 22. The memory case detection provides the timing reference for implementing the proper stop count times for the I and Q memory address counters (c) as shown in FIG. 23. The I and Q memory address counters continue in the proper up and down count sequence, as shown in FIG. 18 and FIG. 19, with the proper stop count times provided by the memory case detection (b) shown in FIG. 23. The timing control for the I and Q signal conditions (f and g) is determined by the signal case detection (d) and even chip location (ELC) signals (e), as shown in FIG. 23. These signals provide the required I and Q signal timing shown in FIG. 18 and FIG. 19.

As shown in FIG. 23, timing for the I and Q signal conditions (f and g) is controlled by the signal case detection (d) and even chip location (ELC) signals (e). To generate the required signal during this period of time, the case condition determined by the signal case detection is used along with the even chip location (ELC) signal. FIG. 18 shows the I and Q signal conditions required for a −90 or 90 degree phase change for a past symbol phase of 0 or 180 degrees. For the chip period where either the I or Q signal condition is defined as 0 or 1, the signal state can be either, since the memory address counter is placed in a stop count mode during the chip period time.

FIG. 24 shows that these required signals are generated by delaying and advancing the I and Q modulation sequences and performing a multiplication operation (exclusive-or operation for digital signals). Using the signal case detection (h) to apply the multiplication operation (exclusive-or operation for digital signals) only over the first chip period for the Q signal condition (i) signal and holding in that state across a 3 chip period window. FIG. 19 shows the I and Q signal conditions required for a −90 or 90 degree phase change for a past symbol phase of −90 or 90 degrees.

The I and Q signal conditions are generated using the same process as used for a 0 or 180 degree symbol past phase, except the multiplication operation in the first chip period is used for the I signal condition versus the Q signal condition. This is done by delaying or advancing the I and Q modulation sequence and performing a multiplication operation (exclusive-or operation for digital signals) and using the signal case detection (h) to apply the multiplication operation (exclusive-or operation for digital signals) only over the first chip period for the I signal condition (d) and holding in that state across the 3 chip period window.

Figure 5:
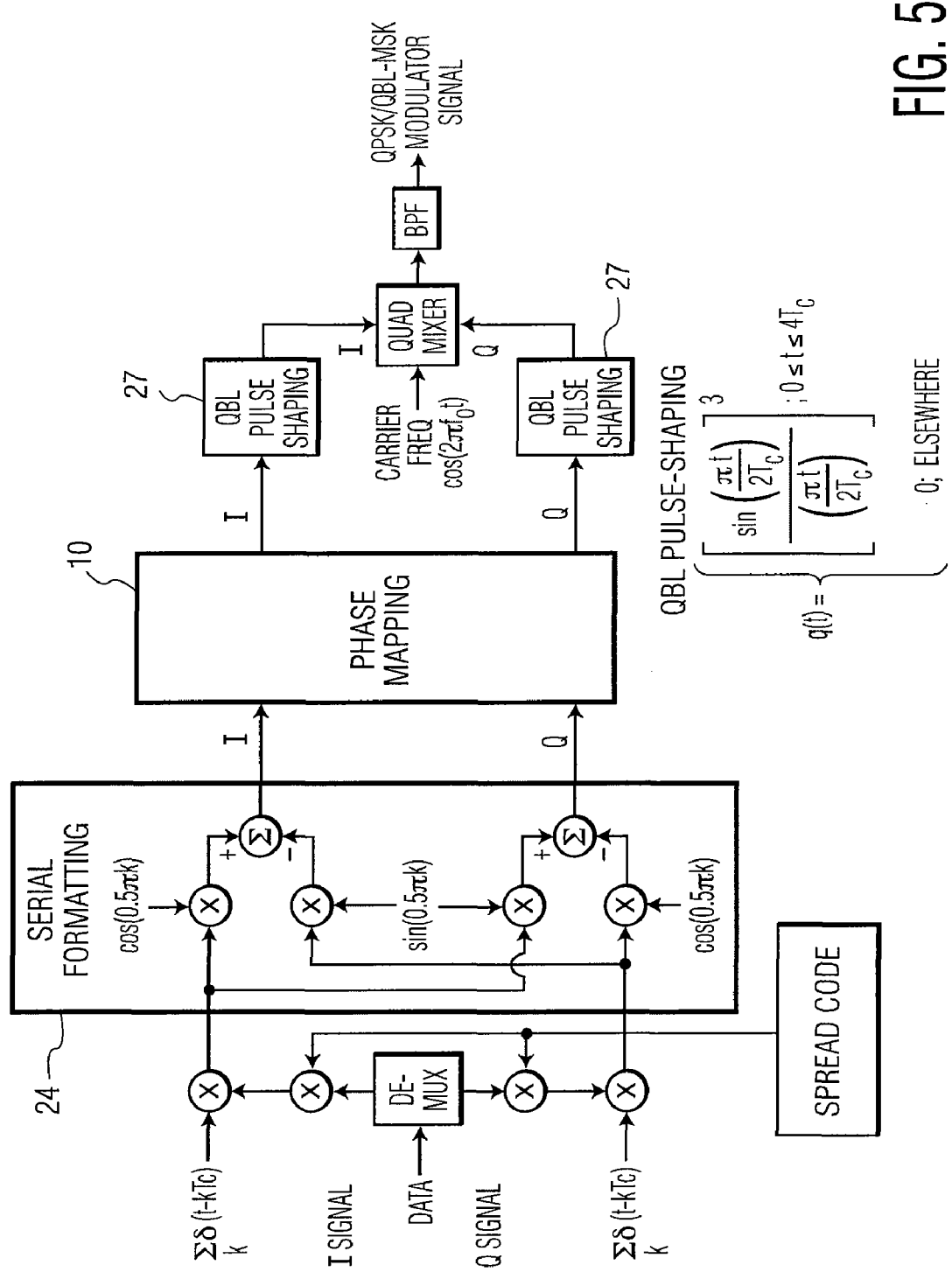
FIG. 5 shows a block diagram of a QPSK/QBL-MSK modulator with a phase mapping module.
Figure 6:
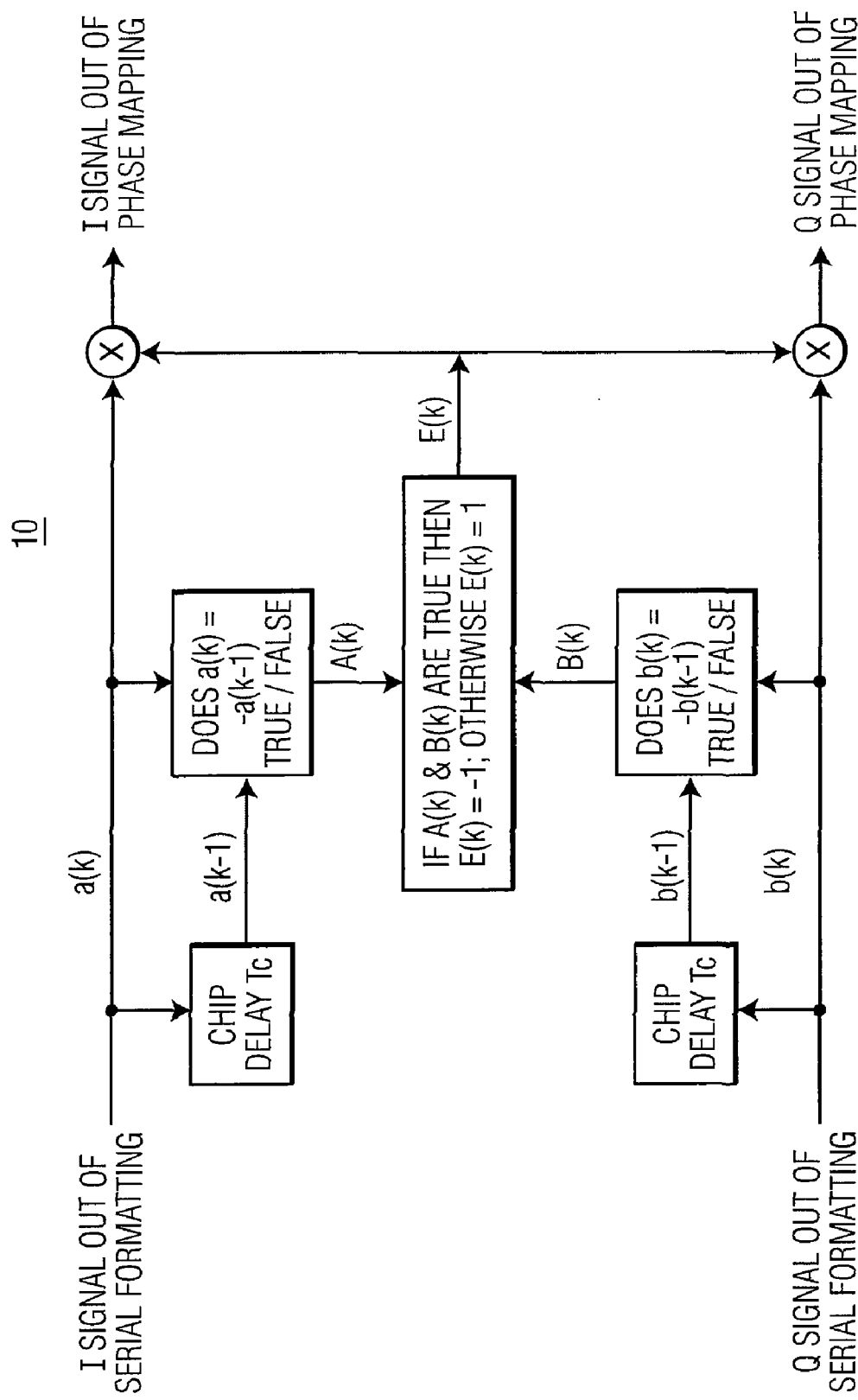
FIG. 6 shows a top level block diagram of the phase mapping module of FIG. 5.
Figure 7:
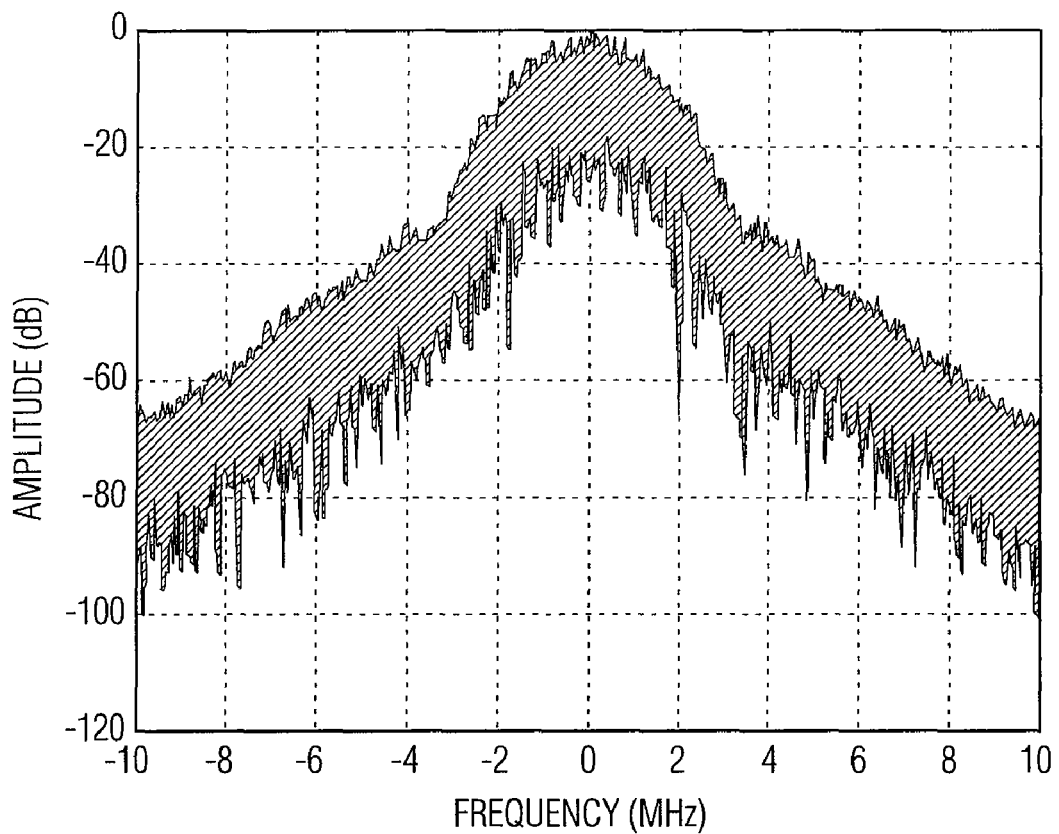
FIG. 7 shows a power spectrum for a QPSK/QBL-MSK waveform.

Referring to FIG. 5, the I and Q signals out of the modulator are either up-converted using an analog or digital up-converter. For the analog up-conversion, the I and Q signals are converted to analog signals with an independent I and Q digital-to-analog converter followed by a lowpass filter before being up-converted with an analog quadrature mixer. The lowpass filter removes any sampling images. For digital up-conversion, the I and Q signals are up-converted using a digital quadrature mixer and then converted to analog signals with a single DAC followed by a bandpass filter. The bandpass filter removes any sampling images. For the digital up-conversion, the I and Q modulator signals can be interpolated up to a higher sampling rate by using interpolation techniques or running the I and Q signal memory at a higher sampling rate.

Figure 25:
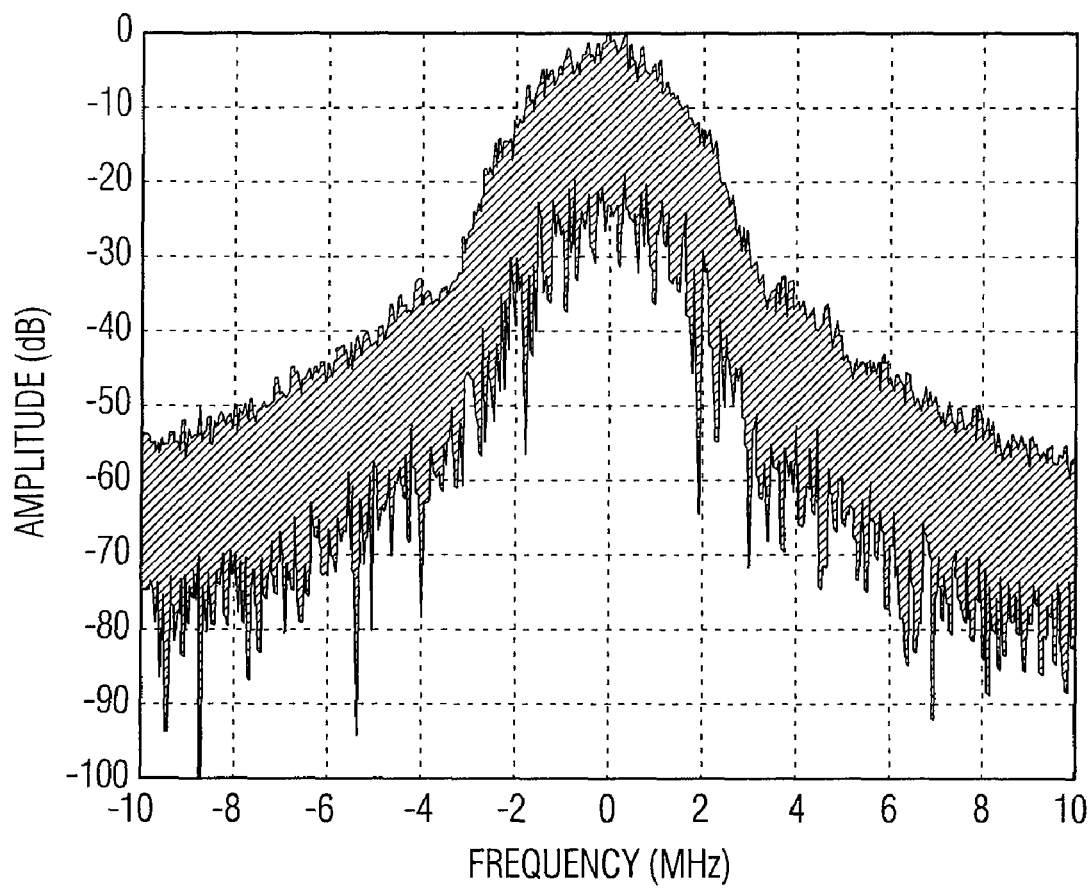
FIG. 25 shows the power spectrum for a QPSK/QBL-MSK modulated signal using the mapping process of the present invention.
Figure 26:
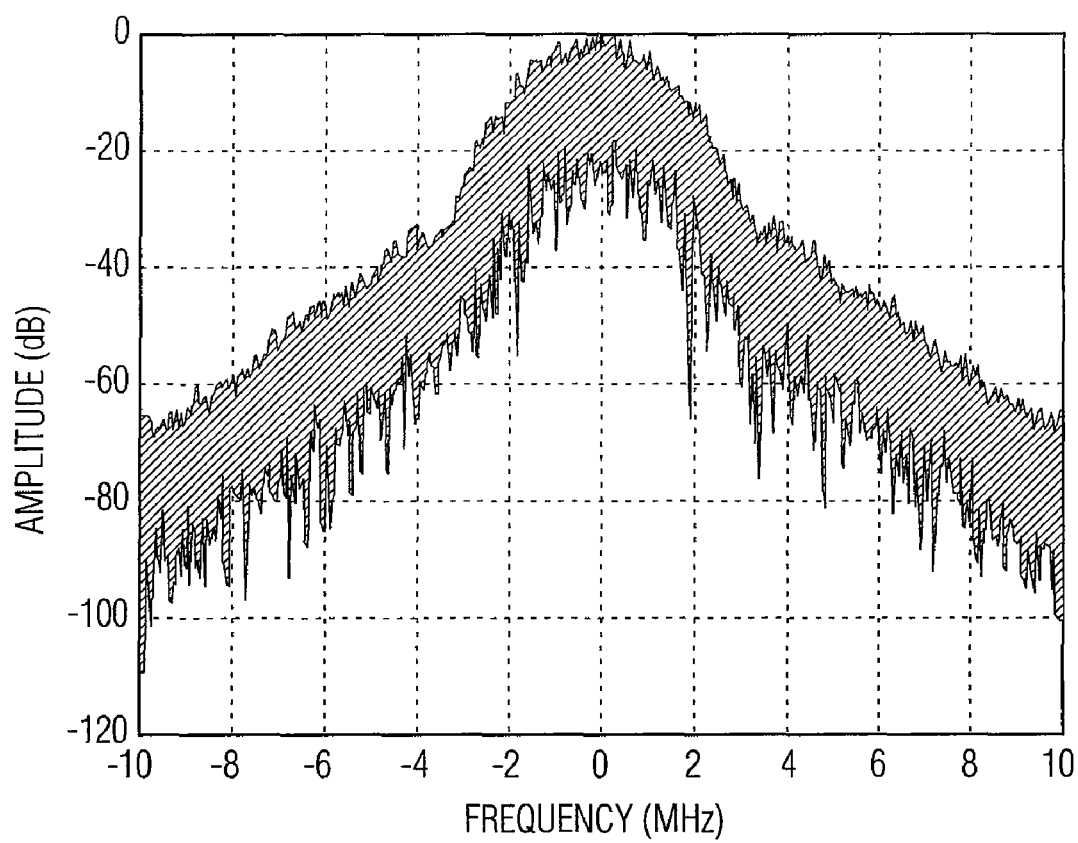
FIG. 26 shows the power spectrum for a QPSK/QBL-MSK modulated signal using the process of the present invention with additional filtering.

FIG. 25 shows the power spectrum for the QPSK/QBL-MSK modulated signal using this mapping technique at 4.8 Mcps with 8 chips per symbol. The sidelobe roll-off is slightly higher than obtained for BPSK data modulation. This is due to the I or Q signal that is set to zero for a −90 or 90 degree phase change, which does not provide a smooth signal transition at the end conditions. Improved performance is achieved by changing the mapping during this condition to the chip pulse-shape, which adds two additional memory conditions and additional circuit complexity to detect this condition. Similar improvement in power spectrum roll-off is achieved by filtering the QPSK/QBL-MSK modulated signal with a 6 MHz Butterworth lowpass filter with 5 poles, or equivalent bandpass filter. FIG. 26 shows the power spectrum with the additional filtering.

For other similar and non-similar disclosures, please refer to the following five applications filed on the same day as this application. These five applications are TBD (and, respectively, correspond to the following five provisional applications 60/703,316; 60/703,180; 60/703,373; 60/703,320 and 60/703,095). These applications are all incorporated herein by reference in their entireties.

Although illustrated and described herein with reference to certain specific embodiments, the present invention is nevertheless not intended to be limited to the details shown. Rather, various modifications may be made in the details without departing from the spirit of the invention. The scope of the invention is to be defined by the following claims.

What is claimed:

1. A method in a receiver of pulse shaping a modulated sequence spread signal having serially formatted in-phase (I) and quadrature (Q) waveforms, each waveform including a predetermined number of chips per symbol, the method comprising the steps of:
   examining, by a processor in the receiver, adjacent chips of the I and Q waveforms at a symbol boundary;
   determining, by the processor, that one of the I or Q waveforms, at the symbol boundary, includes two adjacent first and second chips separated by a single chip period, where the first chip belongs to a previous symbol and the second chip belongs to a present symbol;
   extending, by the processor, for the one chip period, a peak value of the first chip; and
   zeroing, by the processor, the other waveform of the I or Q waveform during the extended duration of the peak value.

2. The method of claim 1, wherein
   the determining step includes determining that the Q waveform includes the two adjacent first and second chips separated by a single chip period, and
   the zeroing step includes zeroing the I waveform during the extended duration of the peak value.

3. The method of claim 1, wherein
   the determining step includes determining that the I waveform includes the two adjacent first and second chips separated by a single chip period, and
   the zeroing step includes zeroing the Q waveform during the extended duration of the peak value.

4. The method of claim 1, wherein
   the examining step includes determining that there exists both of the following conditions:
   (a) a symbol state of 0 or 180 degrees before the symbol boundary, and
   (b) a phase change of −90 or +90 degrees after the symbol boundary.

5. The method of claim 1, wherein
   the examining step includes determining that there exists both of the following conditions:
   (a) a symbol state of −90 or +90 degrees before the symbol boundary, and
   (b) a phase change of −90 or +90 degrees after the symbol boundary.

6. The method of claim 1 wherein
   the step of extending the peak value of the first chip includes extending a fixed value of +1 or −1 signal level between the first chip and the second chip.

7. The method of claim 1 wherein
   the modulated sequence spread signal is one of offset quadrature phase shift keying (OQPSK), minimum shift keying (MSK), quasi band limited-MSK (QBL-MSK), Gaussian MSK, tamed frequency modulation (TFM), intersymbol jitter free OQPSK, raised cosine filtered OQPSK, or bandwidth efficient continuous phase modulation (CPM), and
   the method further includes the step of:
   transmitting the modulated sequence spread signal, after extending the peak value of the first chip between the first and second chips.

8. The method of claim 1 wherein the number of chips per symbol are 8 chips.

9. The method of claim 1 including the step of:
   pulse shaping the modulated sequence spread signal using a look up table (LUT) stored in memory.

* * * * *